United States Patent [19]
Donnelly

[11] Patent Number: 5,864,617
[45] Date of Patent: Jan. 26, 1999

[54] CALL QUEUING AND DISTRIBUTION

[75] Inventor: David R. Donnelly, Felixstowe, England

[73] Assignee: British Telecommunications Public Limited Company, London, England

[21] Appl. No.: 699,584

[22] Filed: Aug. 13, 1996

[30] Foreign Application Priority Data

Mar. 26, 1996 [GB] United Kingdom .................... 9606298

[51] Int. Cl.⁶ ...................................................... H04M 5/06
[52] U.S. Cl. ............................ 379/266; 379/243; 379/291
[58] Field of Search ..................................... 379/243, 244, 379/245, 246, 247, 248, 265, 266, 142, 127, 291, 292

[56] References Cited

U.S. PATENT DOCUMENTS

| | | | |
|---|---|---|---|
| 4,451,705 | 5/1984 | Burke et al. ............................. | 379/266 |
| 5,268,903 | 12/1993 | Jones et al. .............................. | 379/165 |
| 5,444,774 | 8/1995 | Friedes ..................................... | 379/266 |
| 5,590,188 | 12/1996 | Crockett .................................. | 379/207 |

*Primary Examiner*—Ahmad F. Matar
*Attorney, Agent, or Firm*—Nixon & Vanderhye, P.C.

[57] ABSTRACT

Incoming calls on a plurality of lines ($L_i$) are distributed to a plurality of resources ($R_n$) by a queuing and distribution system which associates with each of the possible resource/line combinations a so called "pleasure value" that indicates the desirability of making the line/resources connection according to predetermined criteria, such as waiting time, resource type, type of incoming call and other factors. The pleasure values are set up in a matrix which is scanned repetitively in order to determine the highest value and the runner up, and call connections are made on the basis of the outcome of the scanning process.

41 Claims, 17 Drawing Sheets

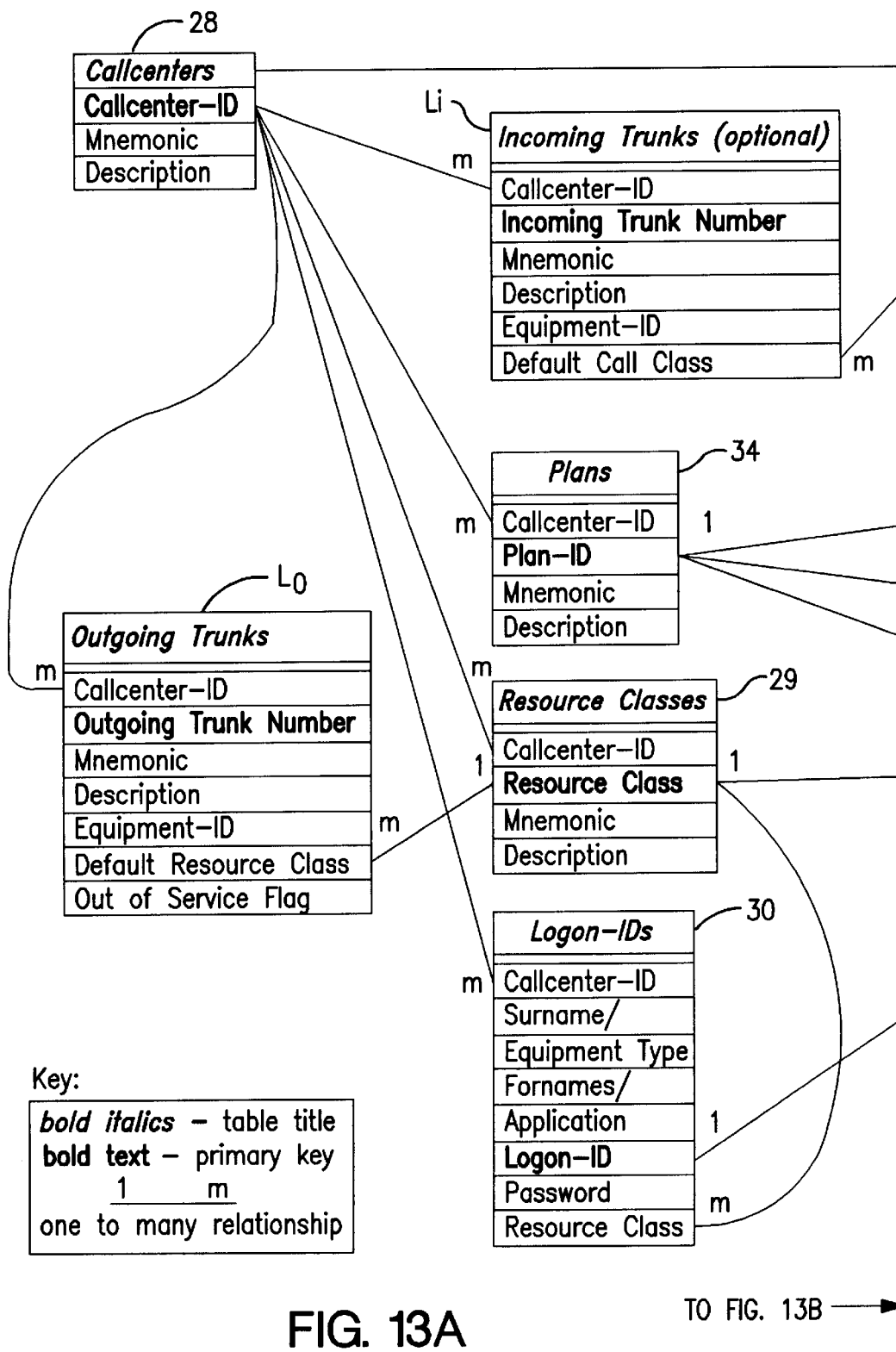
FIG. 13A    TO FIG. 13B →

Static Data Relationships

← TO FIG. 13A

Table I.1—Dynamic Line Data

| Dynamic Line Data |
|---|
| Incoming Trunk Number |
| LineState |
| LineTimer |
| LineCallingTelephoneNumber |
| LineCallClass | index.
integer (most significant bits may contain a sequence number).
integer: tenths of seconds from entering an alerting state.
string: containing the originating caller's line identity
integer: call classification derived from Incoming Truck Number, Calling Telephone Number and Dialed Telephone Number or CTI info from host computer.

Table I.2—Dynamic Resource Data

| Dynamic Resource Data |
|---|
| Outgoing Trunk Number |
| ResourceState |
| ResourceTimer |
| ResourceLogonID |
| ResourceClass | index.
integer (most significant bits may contain a sequence number).
integer: tenths of seconds from entering idle state.
string: containing the human (or application) user identity.
integer: human user (or application) type derived from the ResourceLogonID.

Table I.3—Dynamic HotCall Data

| Dynamic HotCall Data |
|---|
| HotCall Record Number |
| HotCallCallClass |
| HotCallCallingTelephoneNumber |
| HotCallLogonID |
| HotCallRevesion | index.
integer: either i) HotCallCallClass or
string: ii) HotCallCallingTelephoneNumber specified.
string: ResourceLogonID to find.
integer: tenths of seconds delay before other resources considered.

Table I.4 — Call Object Data

| Call Object: public data attributes... | |
|---|---|
| Call Object Number | index. |
| Call Class | ie. looked up from the Configuration Data during instantiation. |
| Line Number | ie. the Incoming Trunk number that the call was presented on. |
| Line State (&Seq.) | ie. Line State (and optional Sequence number), as at Call Object instantiation, for later validation by the cross-connection program. |
| Time Stamp | ie. Absolute time (eg. GMT) that the Line was raised to an Alerting state to the nearest tenth of a second. |
| HotCall Reversion Time | ie. looked up from the Configuration Data during instantiation. |
| HotCall Login-id | ie. looked up from the Configuration Data during instantiation. |
| Precedence | ie. looked up from the Configuration Data during instantiation. |
| Priority Value 1 | ie. looked up from the Configuration Data during instantiation. |
| Resource Class 1 | ie. looked up from the Configuration Data during instantiation. |
| Priority Value 2 | ie. looked up from the Configuration Data during instantiation. |
| Resource Class 2 | ie. looked up from the Configuration Data during instantiation. |
| — | |
| Priority Value n-1 | ie. looked up from the Configuration Data during instantiation. |
| Resource Class n-1 | ie. looked up from the Configuration Data during instantiation. |
| Priority Value n | ie. looked up from the Configuration Data during instantiation. |
| Resource Class n | ie. looked up from the Configuration Data during instantiation. |

FIG. 16B

Table I.5—Logon Object Data

| Login Object: public data attributes... | |
|---|---|
| Login-id | ie. index. |
| Resource Class | ie. looked up from the Configuration Data during instantiation. |
| Resource Number | ie. the Incoming Trunk number that the call was presented on. |
| Resource State (&Seq.) | ie. Resource State (and optional Sequence number), as at Login Object instantiation, for later validation by the cross-connection program. |
| Time Stamp | ie. Absolute time (eg. GMT) that the Resource became Idle to the nearest tenth of a second. |
| Call Class 1 | ie. looked up from the Configuration Data during instantiation. |
| Call Class 2 | ie. looked up from the Configuration Data during instantiation. |
| — | |
| Call Class n−1 | ie. looked up from the Configuration Data during instantiation. |
| Call Class n | ie. looked up from the Configuration Data during instantiation. |

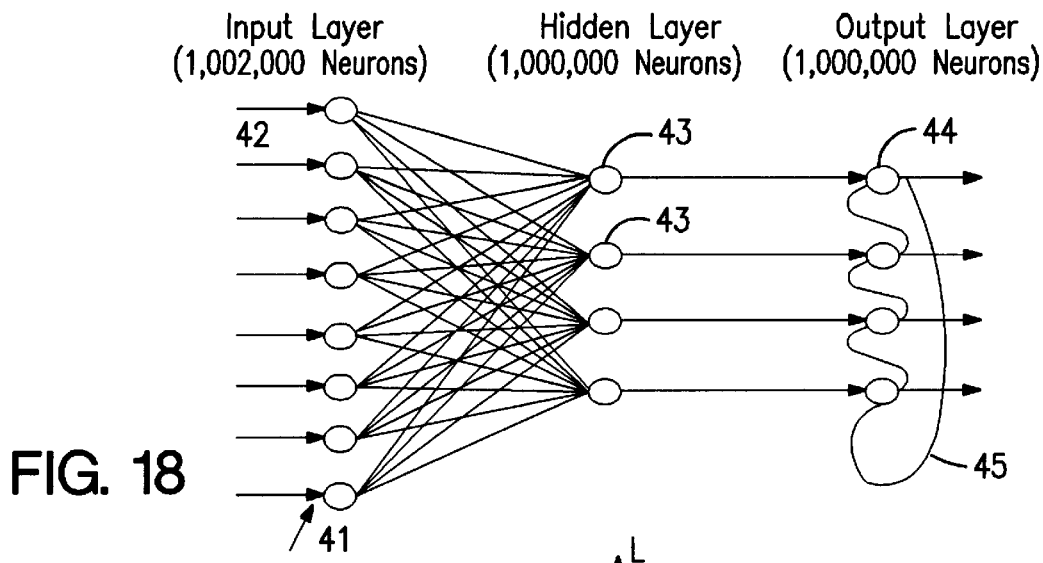

FIG. 18

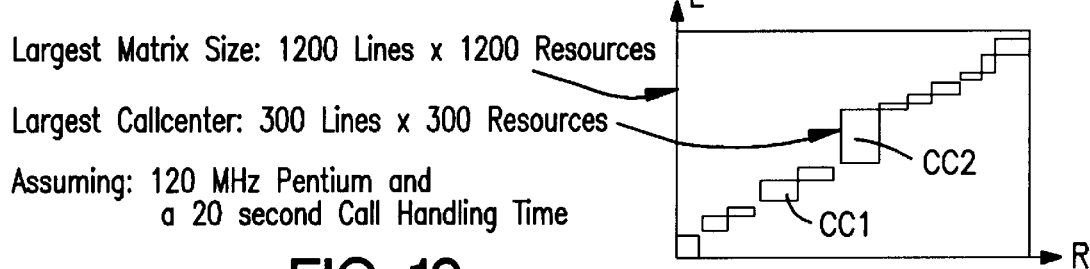

Largest Matrix Size: 1200 Lines x 1200 Resources

Largest Callcenter: 300 Lines x 300 Resources

Assuming: 120 MHz Pentium and
a 20 second Call Handling Time

FIG. 19

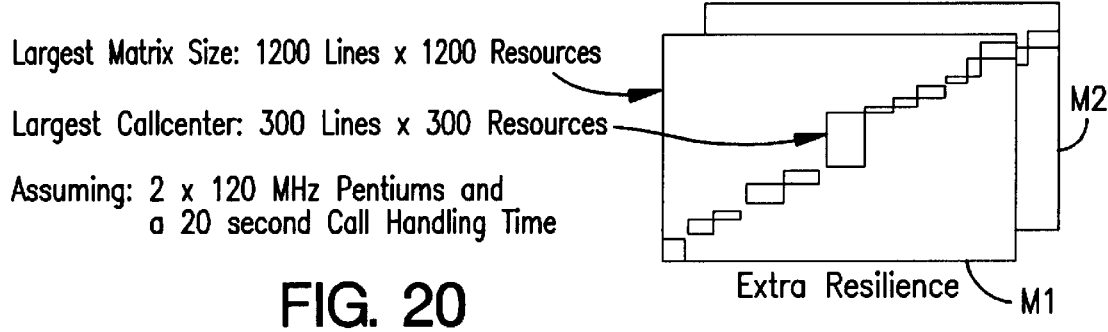

Largest Matrix Size: 1200 Lines x 1200 Resources

Largest Callcenter: 300 Lines x 300 Resources

Assuming: 2 x 120 MHz Pentiums and
a 20 second Call Handling Time

FIG. 20

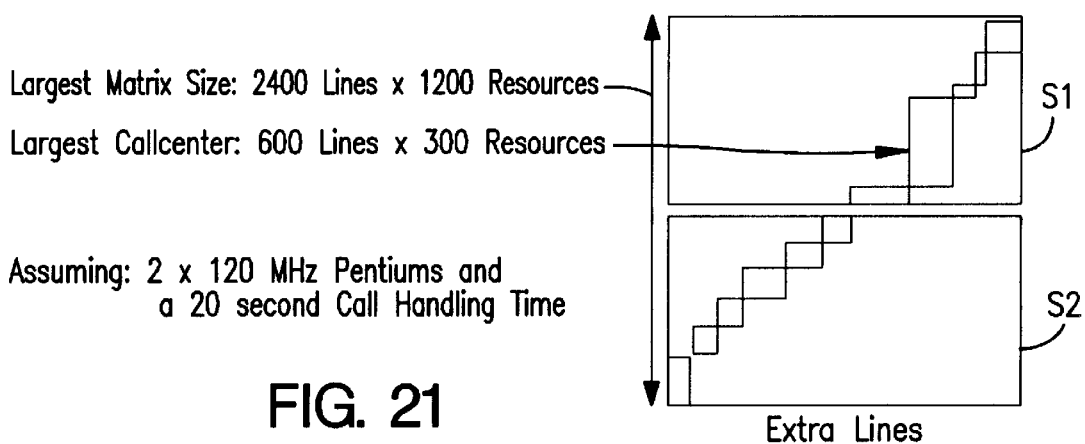

Largest Matrix Size: 2400 Lines x 1200 Resources

Largest Callcenter: 600 Lines x 300 Resources

Assuming: 2 x 120 MHz Pentiums and
a 20 second Call Handling Time

FIG. 21

CALL QUEUING AND DISTRIBUTION

BACKGROUND OF THE INVENTION

1. Field of the Invention

This invention relates to an apparatus and method for distributing concurrent incoming calls on a plurality of lines to a plurality of resources.

2. Description of the Related Art

For a number of customer services, incoming telephone calls need to be distributed to a finite number of resources and difficulties have arisen hitherto in prioritizing the calls for connection to the resources. For example, in a telephone directory assistance service, incoming calls need to be connected to a fixed number of resources in the form of manual telephone operators. A number of approaches have been adopted previously to optimize the connection of incoming calls so as to minimize queuing. Reference is directed to "The Edgeley Electronic Queuing Equipment" D. R. Donnelly and R. J Hirst, British Telecommunications Engineering, Vol. 1, part 3, October 1982, p 155. More sophisticated systems have been proposed, to include multiple queues, priority lines, alternative routings and calendar time of day routing plans. The previous approaches have all used rules-based algorithms in order to meet customers requirements. However, as the number of incoming lines and resources is increased, the rules required for the algorithm become very complex and difficult to optimize in themselves. An example of a rules based procedure is set out in FIG. 1 and comprises a series of IF statements IF1, IF2, etc. Each IF statement is designed to provide a specific test for incoming calls. The chevrons < > indicate customer specified tests or values to enable individual customers to be connected depending on their priority or their particular needs. Different priorities may be given to different telephone numbers, for example.

While a call is waiting, the IF statements are read from the top down repetitively until one of the IF statements becomes true, and then the action specified in the statement is carried out.

However, it will be seen that this configuration becomes unwieldily and unduly complicated when a large number of incoming calls are to be processed and connected to a large number of resources. The rules based system shown in FIG. 1 permits calls to be allocated to different queues. The resources answering the calls may support more than one queue i.e. be able to deal with enquiries of more than one type, so that balancing the incoming call load to the individual resources becomes a complex problem usually requiring manual intervention by a network supervisor. The present invention provides an alternative approach which seeks to overcome the restrictions associated with the prior rules-based systems.

SUMMARY OF THE INVENTION

According to the present invention there is provided a method of distributing concurrent incoming calls on a plurality of lines to a plurality of resources, comprising: associating with each of a plurality of different individual combinations of the lines and resources, a respective value of an operating parameter in dependence upon a desirability according to predetermined criteria, of interconnecting the line and resource of the combination, repeatedly reviewing the values of the operating parameter corresponding to the combinations, and selecting at least one of the combinations for interconnection as a result of the reviews.

Thus, in accordance with the invention, different individual combinations of the lines and resources are considered and are given an associated value of an operating parameter which indicates the desirability of making an interconnection between the line and resource. In the examples described hereinafter, the operating parameter comprises a "pleasure value" and the method involves selecting at least one of the line/resource combinations that exhibits the most pleasure i.e. the highest pleasure value.

The operating parameter associated with a particular line and resource combination may be a function of the time that an incoming call has been waiting on the line to be connected to one of the resources. The parameter may also be associated with the time that the resource has been idle. The incoming calls may be of different classes e.g. from different telephone numbers, services or customer account types, and the value of the operating parameter associated with a particular line and resource combination may be a function of a precedence associated with the class of incoming call. By actively detecting the call class, different services or calls from particular customers may be processed in preference to calls from others.

Also, the resources may be arranged in classes e.g. resources capable of handling different types of incoming calls. For example, the resources may comprise telephone operators who have had different levels of training to deal with different types of enquiries. The resource classes may be allocated a precedence in a similar manner to the incoming call classes. The value of the operating parameter associated with the particular line and resource combinations may be a function of the class of the resource for the combination. Furthermore, particular calls may be given a priority value dependent upon the particular values of the call class and the resource class for the line and resource combination. The operating parameter for the combination may be set as a function of the priority value attributed to the combination.

The method of the invention is also susceptible to a manual override and the operating parameter may be set as a function of expert data defined for example by a service provider. In particular, the precedences and the priority values for particular line and resource combinations may be set according to user determined expert data.

The method may be used to select a first most desirable and a second next most desirable line and resource combination on the basis of the values of the operating parameter during each of the periodic reviews.

The invention also includes apparatus for distributing a plurality of concurrent incoming calls to a plurality of resources, comprising: a plurality of incoming lines for the calls, a plurality of outgoing lines for connection to the resources, means for associating with each of a plurality of different individual combinations of the incoming and outgoing lines, a respective value of an operating parameter as a function of a desirability according to predetermined criteria, of interconnecting a call on the incoming line and resource for the outgoing line corresponding to the combination, and means for repeatedly reviewing the values of the parameters corresponding to the combinations, and selecting at least one of the combinations in dependence upon the review.

The apparatus may include display means for displaying a two-dimensional matrix of call classes and resource classes, and for providing a visual indication on the matrix of the priority value currently associated with each resource class/call class combination. The display means may also provide a display of the current values of precedence associated with different call classes.

The apparatus may include cross connect means operative to interconnect the selected combination of input and output lines.

The apparatus may be configured for operation in a public telephone network with the incoming and outgoing lines being arranged to connect incoming calls from remote locations to the resources disposed at least in part at locations remote from the apparatus. In this way, the network provider can provide a service which allows customers of the network themselves to provide a service with a plurality of resources, for example telephone operators or voice mail machines or other recorded message devices, by which callers can be connected to the resources in a manner which minimizes queuing, with the call distribution apparatus being configured in the network, rather than at the premises of the customer. The apparatus may be located in a public telephone network exchange. Hereinafter, the provision of such a service is referred to as a Callcenter service. The apparatus according to the invention has the advantage that the Callcenter service can use resources, such as telephone sales personnel who are not located at the premises of the customer but may operate from a number of different locations e.g. from home. Thus, the network customer does not need to have all of the telephone sales operatives located in an office but can be located at different sites.

Alternatively, the apparatus may be configured for operation in a private branch telephone exchange, with the incoming and outgoing lines being arranged to connect incoming calls from remote locations to the resources disposed at least in part at locations proximate to the exchange. Thus, the apparatus can be used to control call distribution when a number of resources are located at the offices of a customer of the network provider, where incoming calls are fed through the network to private branch telephone exchange.

Preferably, the selecting means includes scanning means operative to scan through the current operating parameter values for all the incoming/outgoing line combinations, and parameter value selection means operative to select the combination which has an associated scanned value of said operating parameter that corresponds to the highest of the scanned values in respect of the desirability of connection, e.g. the highest pleasure value.

First and second scanning means and parameter selecting means may be provided together with means for choosing the combination to be connected as a function of the selection made by either or both of the first and second parameter value selection means. The first and second scanning means may run asynchronously.

The scanning means may alternatively include tile scanning means operative to scan through groups of the current operating parameter values successively, to select from each of the groups the combination which has an associated scanned value of said parameter that corresponds to the highest of the scanned values in respect to the desirability of connection e.g. the highest pleasure value, and to compare the highest parameter values selected for each respective said group so as to select the highest value from all of the scanned groups.

In another configuration, the selecting means includes parallel scanning means operative to scan through groups of the operating parameter values concurrently.

A plurality of apparatuses in accordance with the invention may be provided, with control management means for allocating selected groups of the incoming and outgoing lines to each respective said apparatus so as to provide a distributed computing environment system. The distributed system can be used to provide a plurality of different Callcenter services.

In order to simplify the computation of the operating parameter, the apparatus may include means for defining log-in objects, corresponding to the resources respectively as a function of static data in respect of the resource and also dynamic data dependent upon whether the resource is idle or in an active state, and means for defining call objects comprising static data for particular call types and/or classes and dynamic data concerning the occurrence of calls on the incoming lines. In practice, there are far fewer active log-in-call object pairs than line-resource combinations, so the processing load is reduced considerably.

In an alternative configuration the apparatus includes means for defining a plurality of software ants operative to wander initially essentially at random through a matrix of the values of the operating parameter associated with the combination, to find a value thereof corresponding to the most desirable combination of incoming line and resource to be connected, the ants being operative to communicate with one another so that they move collectively towards a region in the matrix in which at least one value of the operating parameter indicates an increased desirability of interconnection of the resource/incoming call combination associated therewith as compared with a majority of the parameter values in the matrix.

Alternatively, the apparatus may include a plurality of artificial lifeform software elements for computing the values of the operating parameter in the matrix, and means for allocating computing power to the lifeforms selectively depending on the success of the lifeform in computing a value of the operating parameter that indicates desirability of the interconnection.

In another embodiment, a neural network is used to select the most desirable combination of resource/incoming call.

BRIEF DESCRIPTION OF THE DRAWINGS

In order that the invention may be more fully understood embodiments thereof will now be described by way of example with reference to the accompanying drawings in which:

FIG. 14 illustrates an organization of the dynamic data used in the pleasure value computation;

FIG. 16 illustrates a data organization for the method described with reference to FIG. 15;

FIG. 18 illustrates the use of a neural network to locate high values in the pleasure value matrix;

FIGS. 19 to 22 illustrate alternative hybrid configurations of pleasure value matrix for multiple Callcenters of different sizes;

DETAILED DESCRIPTION OF EXEMPLARY EMBODIMENTS

Figure 1:
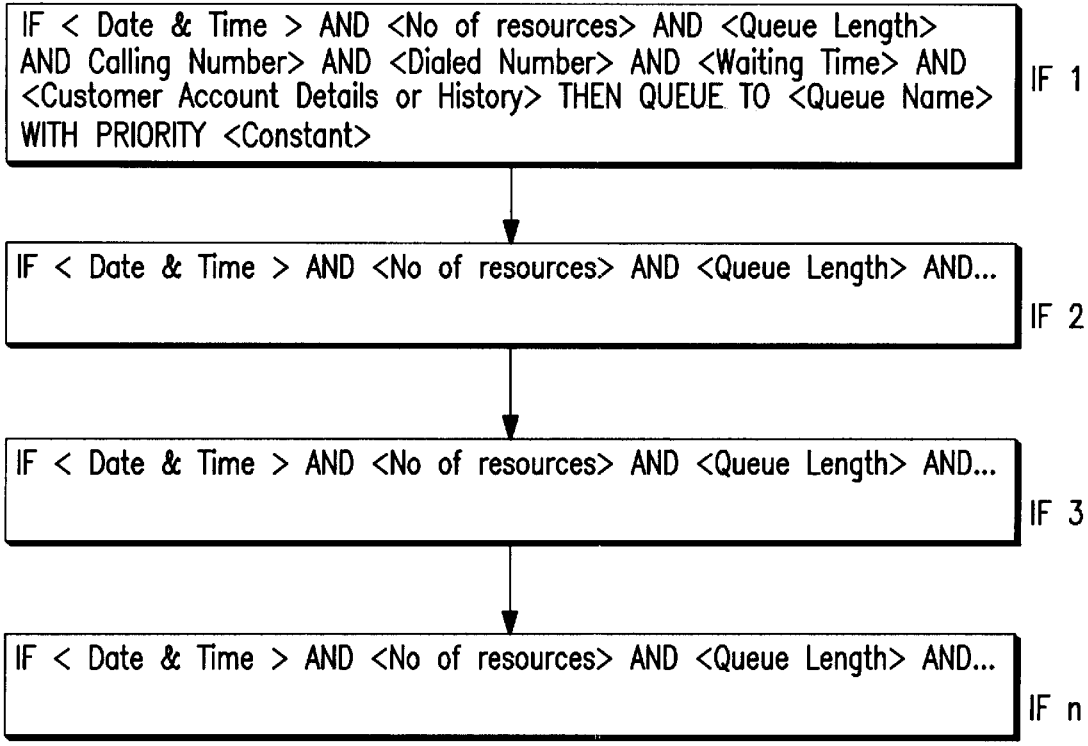
FIG. 1 is an illustration of a prior art rules-based algorithm.
Figure 2:
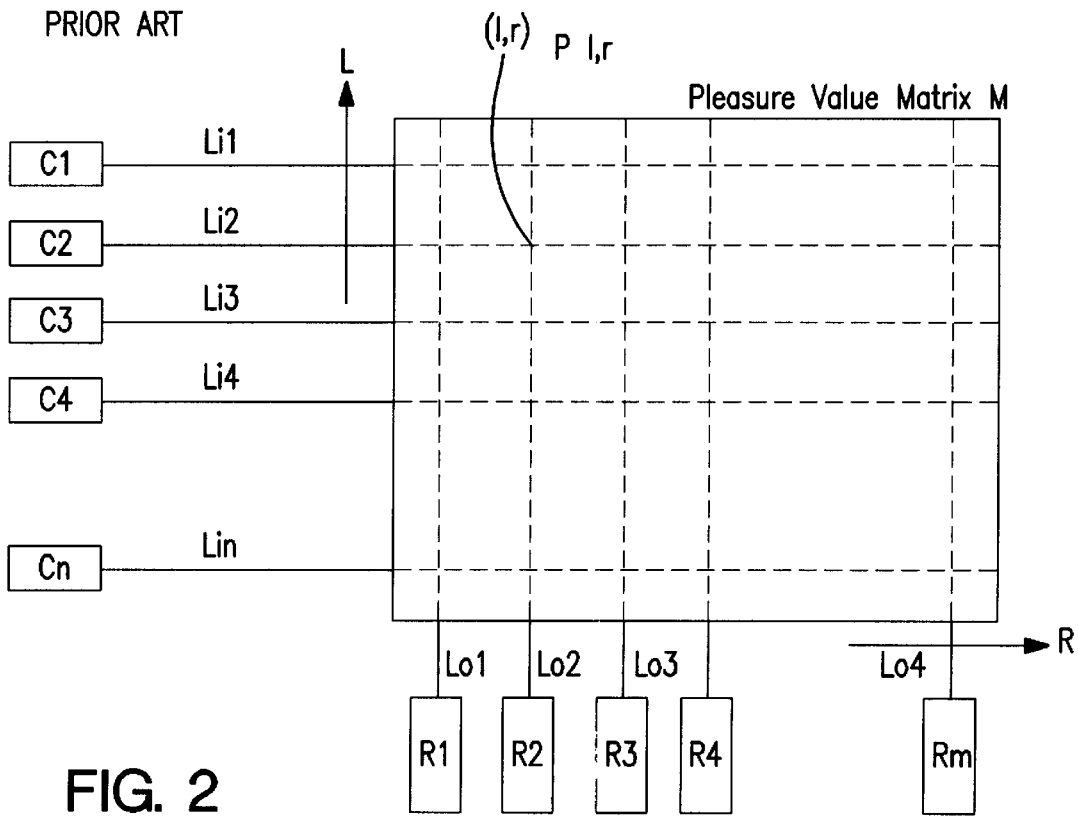
FIG. 2 is a schematic diagram of a pleasure value matrix used in an apparatus according to the invention.

Referring to FIG. 2, calls $C_1$–$C_n$ on incoming lines $L_{i1}$–$L_{in}$ are to be connected to resources $R_1$–$R_m$ through outgoing lines $L_{o1}$–$L_{om}$. In accordance with the invention, rather than using a complex rules-based algorithm to determine the interconnections, the value of an operating parameter is attributed to each possible interconnection between the incoming lines and the outgoing lines that are connected to the resources. This is shown schematically as matrix M in FIG. 2. The value of the operating parameter is referred to herein as a pleasure value and is given a value depending on the desirability of interconnecting a particular line and resource combination. As shown in FIG. 2, an interconnection point 1, r in the pleasure value matrix is attributed a pleasure value $P_{1,r}$.

Figure 3:
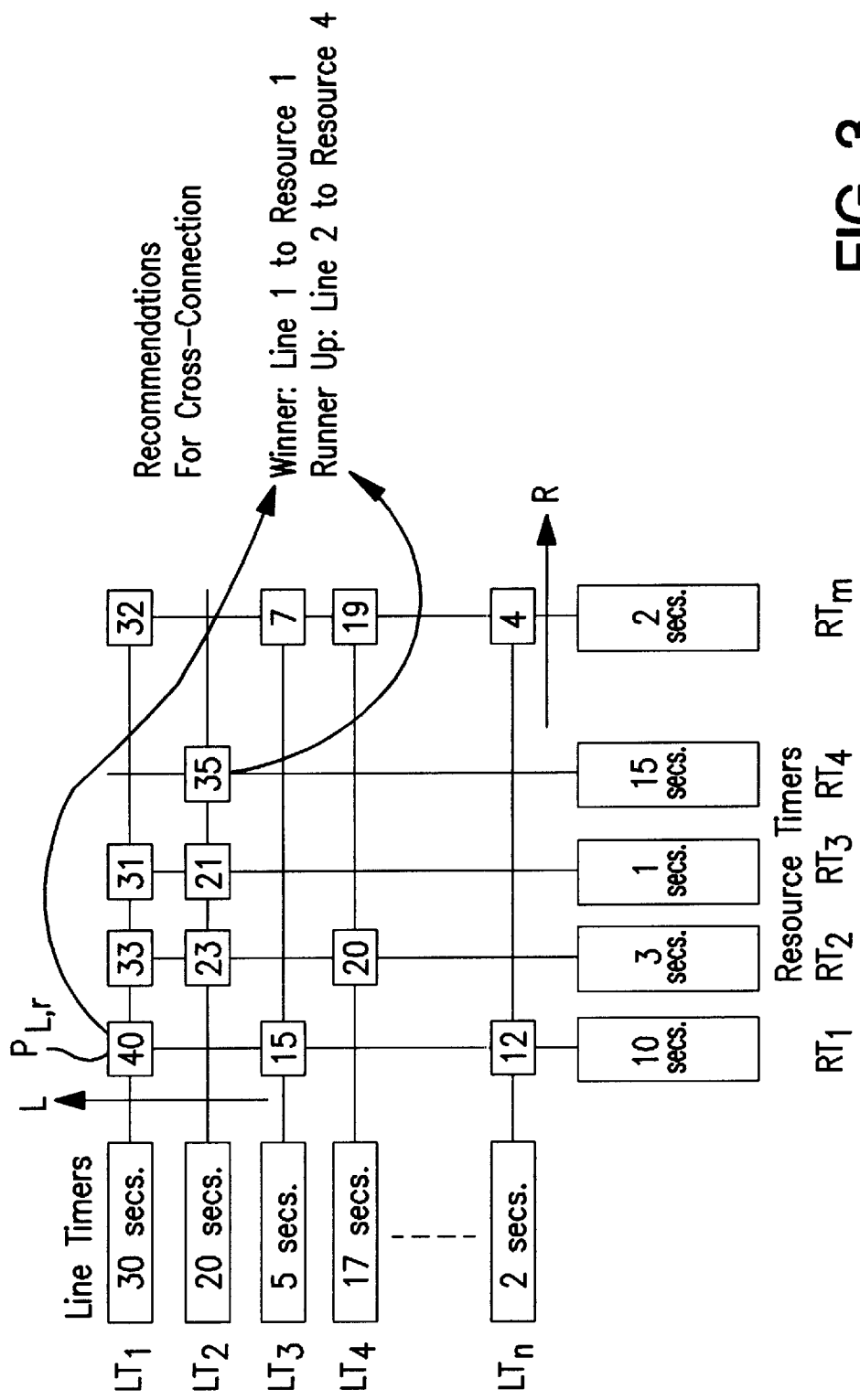
FIG. 3 is a schematic diagram of pleasure values in the pleasure matrix of FIG. 2.

The pleasure values $P_{1,r}$ at the interconnection point 1, r is set according to predetermined criteria as will now be explained. Two of the criteria that are considered are the time that a call has been waiting on line $L_i$ and the time that the resource R and outgoing line $L_o$ has been idle. This is shown schematically in FIG. 3. A series of line timers $LT_1$–$LT_n$ are connected to the incoming lines $L_{i1}$–$L_{in}$ to provide an indication of the time that a call has been waiting. Similarly, resource timers $RT_1$–$RT_m$ are connected to the resources $R_1$–$R_m$. In the example shown in FIG. 3, the line timers and resource timers are summed at the relevant points to provide the pleasure values P for the points 1, r in the pleasure value matrix. The highest value of P and the next highest value denote the winner and runner up of the incoming line/resource combinations. The pleasure value matrix is repeatedly computed and the winner and runner up is repetitively calculated for each computational pass through the matrix. In FIG. 3, line timer $LT_1$ indicates the value of 30 seconds and the resource timer $RT_1$ indicates a time of 10 seconds so that the interconnection of line $L_{i1}$ to resource $R_1$ has the highest pleasure value P where P=30 +10=40 and constitutes the winner. The runner up is constituted by the interconnection between line $L_{i2}$ and resource $R_4$ for which P=35.

The pleasure values attributed to the points in the matrix are also a function of classifications of the incoming calls and the resources as will be explained in more detail hereinafter.

Figure 4:
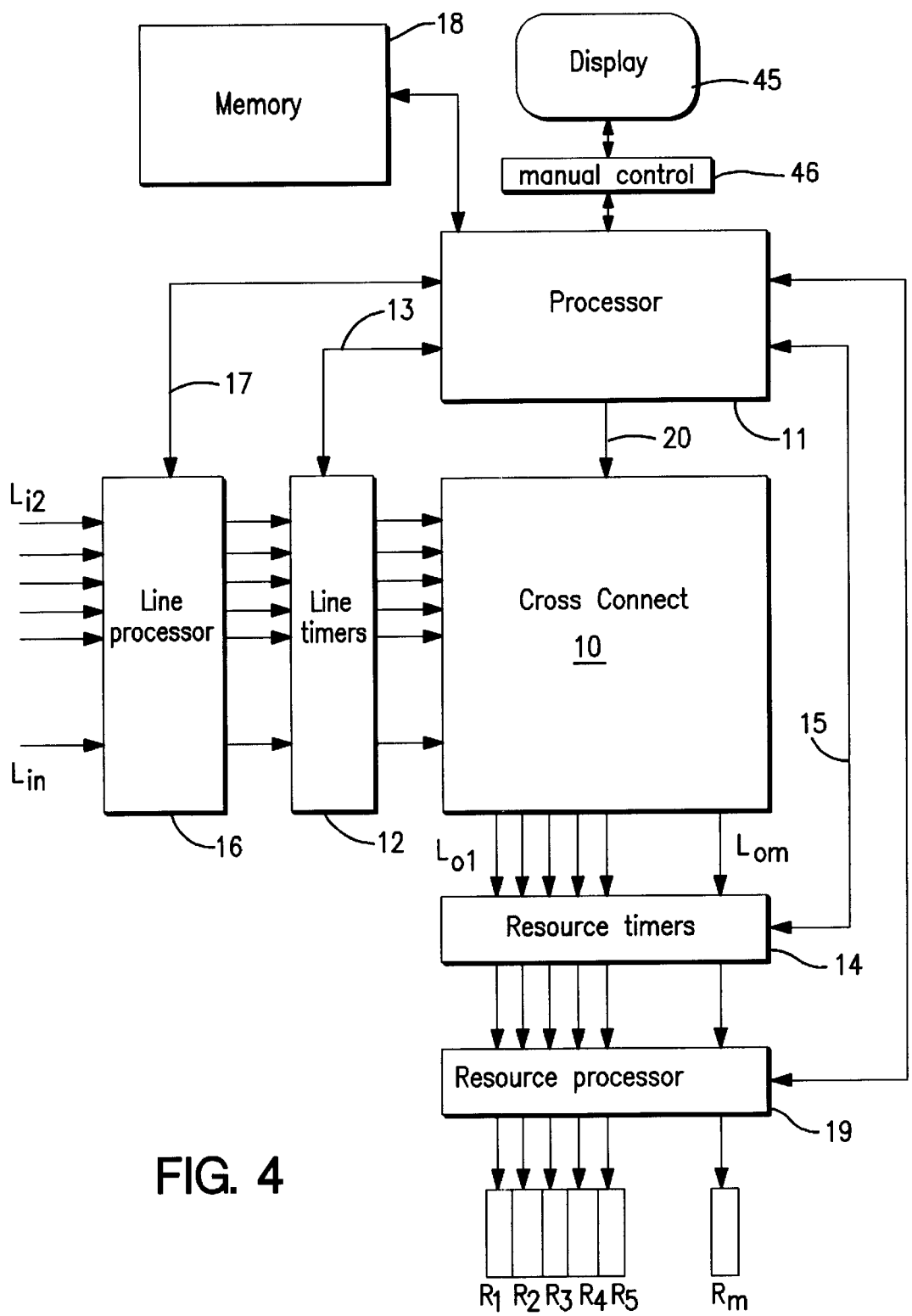
FIG. 4 is a schematic block diagram of a call distribution apparatus according to the invention.

Referring now to FIG. 4, a schematic block diagram of an apparatus in accordance with the invention is shown. The incoming lines $L_{i1}$–$L_{in}$ and the outgoing lines $L_{o1}$–$L_{om}$ are coupled to a cross connect 10 which is controlled by a processor 11 in order to provide physical interconnections between the incoming and outgoing lines, so that any incoming line can be connected to any outgoing line under the control of the processor. The line timers LT are collectively shown as block 12 and determine the time for which calls on individual incoming lines have been waiting. Data concerning the waiting times are fed on line 13 to the processor 11. Similarly, the resource timers RT are shown as block 14, and provide information concerning the time that the individual resources $R_1$–$R_m$ have been idle, the information being fed on line 15 to the processor 11.

The processor 11 computes the individual pleasure values for the pleasure value matrix M shown in FIG. 2 and controls the cross connect 10 accordingly so as to attempt to interconnect the incoming and outgoing lines that correspond to the highest pleasure value. The pleasure value matrix is scanned repetitively by the processor and in the event that the highest value is already connected, the processor commands the cross connect to form an interconnection corresponding to the next highest value of the pleasure value matrix.

As previously mentioned, the pleasure values are determined in dependence on a number of factors in addition to the outputs of the line timers 12, 14. These additional factors depend upon other characteristics of the incoming calls and the resources. The way in which the system acquires data about the resources and incoming lines and uses it in the computation of the pleasure values as will now be described in detail. A number of factors are monitored.

Line State (Dynamic Data)

Each incoming line $L_{i1}$–$L_{in}$ can be represented as a managed object governed by a finite state variable called the line state. The line state moves through a number of different conditions: Initializing, Idle, Alerting, Connecting, Answered, Transfer-Alert, Transfer-Connecting, Transfer-Answered, Archiving, and back to Idle. The transfer states may be skipped over or repeated as often as necessary. The processor 11, when computing the pleasure values, is only concerned with the Alert and Transfer-Alert states as this is when a cross-connection decision is required. The line state for each incoming line $L_i$ is determined by means of a line processor 16 which provides data on line 17 to the processor 11.

Line Timer (Dynamic Data)

Each line object contains data concerning the time that the line $L_i$ has been in an Alerting state, that data being obtained from the line timer 12. In practice, the line timer 12 and line processor 16 may be a single unit.

Telephone Number (Dynamic Data)

The number of the telephone from which the call is being made on line $L_i$, hereinafter the calling telephone number (CTN) and the number being dialed, hereinafter the dialed telephone number (DTN) are available as digital data for each incoming call. The CTN and DTN are detected by the line processor 16 and corresponding data is fed on line 17 to the processor 11.

Call Classification (Static and Dynamic Data)

The incoming calls are classified according to predetermined call classes as a function of the CTN and DTN and any other information available over the digital telephone network. The data concerning call classes may be held in a database, indicated schematically by memory 18 in FIG. 4. The data base may be extended by making use of computer telephony integration (CTI) e.g. by accessing specific, remote, corporate databases. In this way, the customer account details or recent enquiries the customer has made, or recent purchases, or sales opportunities, or the last human call receptionist, or a particular account manager, can be taken into consideration. Also, particular incoming lines $L_i$ may be associated with particular private circuits. Furthermore, the call classification process performed by the line processor 16 may not find a suitable match in the memory 18. To take account of this, each line $L_i$ is provided with a default call class.

Resource State (Dynamic Data)

Each resource R is represented as a managed object governed by a finite state variable called the resource state. Each resource state moves through Initializing, Logged-Off, Idle, Connecting, Alerting, Answered and back to Idle. The Idle state is detected by the resource timers 14 shown in FIG. 4.

Resource Classification (Static and Dynamic Data)

Groups of resources offering the same services are considered as belonging to a single resource class. For example, a group of operators may be trained to a particular level to deal with a particular type of enquiry, whereas other operators will be able to deal with some type of enquiries and not others. Furthermore, the resources may comprise voice mail facilities with predetermined messages or voice driven computer databases. All of these different types of resources and functionalities may be classified in different resource classes.

The outgoing lines $L_{o1}$–$L_{om}$ are each provided within associated default resource class.

The status of the various resources, and the lines $L_o$ and their resource classes is monitored by a resource processor 19, which is practice may incorporate the resource timers 14.

Resource Timers (Dynamic Data)

Each resource object includes data from an appropriate resource timer 14, fed to the processor on line 15.

Precedence (Static Data)

Certain call classes may be more important than others. Each call class is therefore allocated a precedence value. This can be considered to constitute a number of seconds "head start" that a call of a particular class will be given. For example if a call is classified to have a precedence 60, it is considered as if it has been waiting for 60 seconds at the time that the call is initiated with a result that it will be dealt with more quickly than otherwise would be the case.

Priority (Static Data)

When a call first arrives, it will usually be offered to one class of resource over what is referred to as a primary route. If time goes on and still none of those resources are available, then a secondary routing to other resource classes will be considered, and so on, to any number of alternative routings. This approach differs from conventional rules-based algorithms in that the call does not defect from one queue to another. Instead, the scope of the resources available to it is widened in an attempt to minimize call waiting times. This is achieved by providing each permissible combination of call class and resource class, with a priority value that is held in a configuration matrix which, in FIG. 4, is maintained in the memory 18. Primary routes are allocated a priority value of 1 which will cause the processor 11 to endeavor to connect the call immediately. Other routes allocated a priority value of say 30 will only be considered after 29 seconds. All the resources considered for connection by the processor 11 are allocated a "head start" of (Priority_Value$_{max}$-Priority_Value) seconds over and above any precedence value associated with the call class. In this way, primary routes have a "head start" of the Priority_Value$_{max}$ −1 seconds.

Configuration Matrix (Static Data)

The configuration of the above described static data required to compute the pleasure values, is referred to herein as a configuration matrix. The static data that comprises the matrix is primarily stored in the memory 18 shown in FIG. 4 and in reality consists of a number of different arrays:

(i) a relatively small array that holds the precedence of each call class;

(ii) a relatively large array that holds the class of each call on each line;

(iii) a relatively large array that holds the class of each resource; and (iv) a relatively very large array that holds a map of permissible associations between call classes and resource classes so as to provide the priority values. In practice, this array may include a very large number of zero values due to the fact that only a relatively small number of the permissible combinations will be allocated priority values. Consequently the array may be a virtual array to minimize the data storage capacity required.

Algorithm-Pleasure Values

The processor 11 runs an algorithm to compute the individual pleasure values $P_{1,r}$ that make up the pleasure value matrix shown in FIG. 2. The values are computed repetitively on the basis of the static data of the configuration matrix from memory 18 and also dynamic data concerning the state of the lines L derived from the line processors 16, 19.

The processor 11 thus considers every combination of the incoming lines $L_i$ in the Alerting State, and resources R in the Idle State and the pleasure values are calculated as follows:

```
REM: IF Statement (1)
IF(Priority(Call_Class, Resource_Class)=0)OR
(Timer_Value(Line L_i)<(Priority_Value(Call_Class,
Resource_Class)−1)) THEN
Pleasure_Value (P_{1,r}) = 0 {i.e. do not consider this connection}.
ELSE
REM: Routine (2)
Pleasure_Value(P_{1,r})=Timer_Value(line) +
Timer_Value(Resource)+Precedence
(Call_Class)+Priority_Value_{max}−Priority_Value(Call_Class,
Resource_Class)
ENDIF
```

Thus, the pleasure value $P_{1,r}$ is determined for each point of the matrix M as a function of the time that a call on an incoming line $L_i$ has been waiting, the time that the resource for the incoming call-resource combination has been idle, the precedence of the call class and the priority value determined in dependence upon the call class, resource class combination. The algorithm run by the processor 11 provides two outputs, namely a winner and a runner up as follows:

Winner: Line Number ($L_i$), Resource Number (R), Line state, Resource State

Runner up: Line Number ($L_i$), Resource Number (R), Line State, Resource State

These recommendations are then passed on line 20 to the cross connect 10 which runs a cross-connection program in order to make the physical cross-connection between the selected incoming line and outgoing line combinations. The cross-connection program primarily attempts to connect the winning combination as determined by the pleasure value matrix algorithm but in certain circumstances, this may not be possible, due for example to the incoming call having been terminated or for some other reason. In this situation, the cross-connection program reverts to the runner up. The runner up may also be used if $L_i$ (winner)$\neq L_i$ (runner up) AND $R_i$ (winner)$\neq R_i$ (runner up).

The pleasure value matrix algorithm runs repetitively so as to make new recommendations continuously. The line and resource processors 16, 19 update the dynamic data concerning the line states and the resource states asynchronously with the running of the pleasure value matrix algorithm. As will be explained in more detail hereinafter, the lines and resources used by the cross-connect may be deleted (i.e. reset to zero) in the pleasure matrix in anticipation of the line and resource change of state that will occur from them being cross-connected. This minimizes the number of duplicated cross-connection recommendations that may occur during delays in acquiring updated line and resource state information.

Thus, the described system allows a number of incoming calls on a large number of incoming lines $L_i$ to be connected to the resources R in a manner that minimizes call waiting. The system shown in FIG. 4 may be configured in a public network telephone exchange where the incoming lines are arranged to connect incoming calls from remote locations e.g. on trunk lines to resources disposed at locations remote from the exchange. For example, the resource may comprise telephone operators working from home. This permits the network provider to offer a Callcenter so that a customer of the network can offer services to consumers using telephone operators that work from home or at a location remote from the customer's premises. As an example, for a manufacturing business, an after sales service can be provided by telephone, with operators working from home. The operators may be trained to different levels e.g. to be conversant with different products and the problems associated therewith and can be configured in appropriate resource classes so that calls can be directed to them selectively. Furthermore, data concerning consumers's telephone numbers can be included in the configuration matrix so that calls from particular consumers can be preferentially routed to particular resources.

Figure 6:
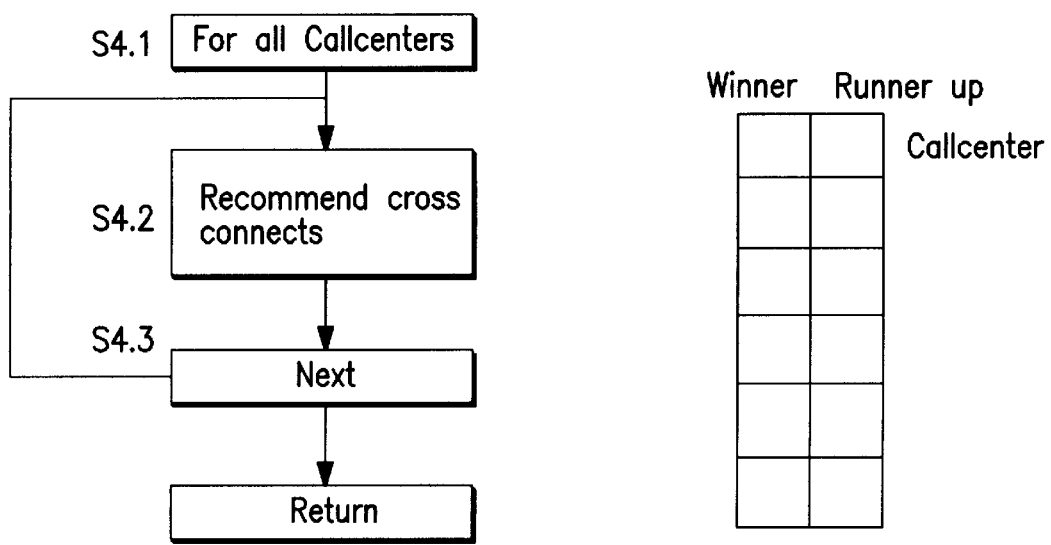
FIG. 6 is a flow chart of the process by which winners and runners up of the pleasure value matrix are recommended.
Figure 7:
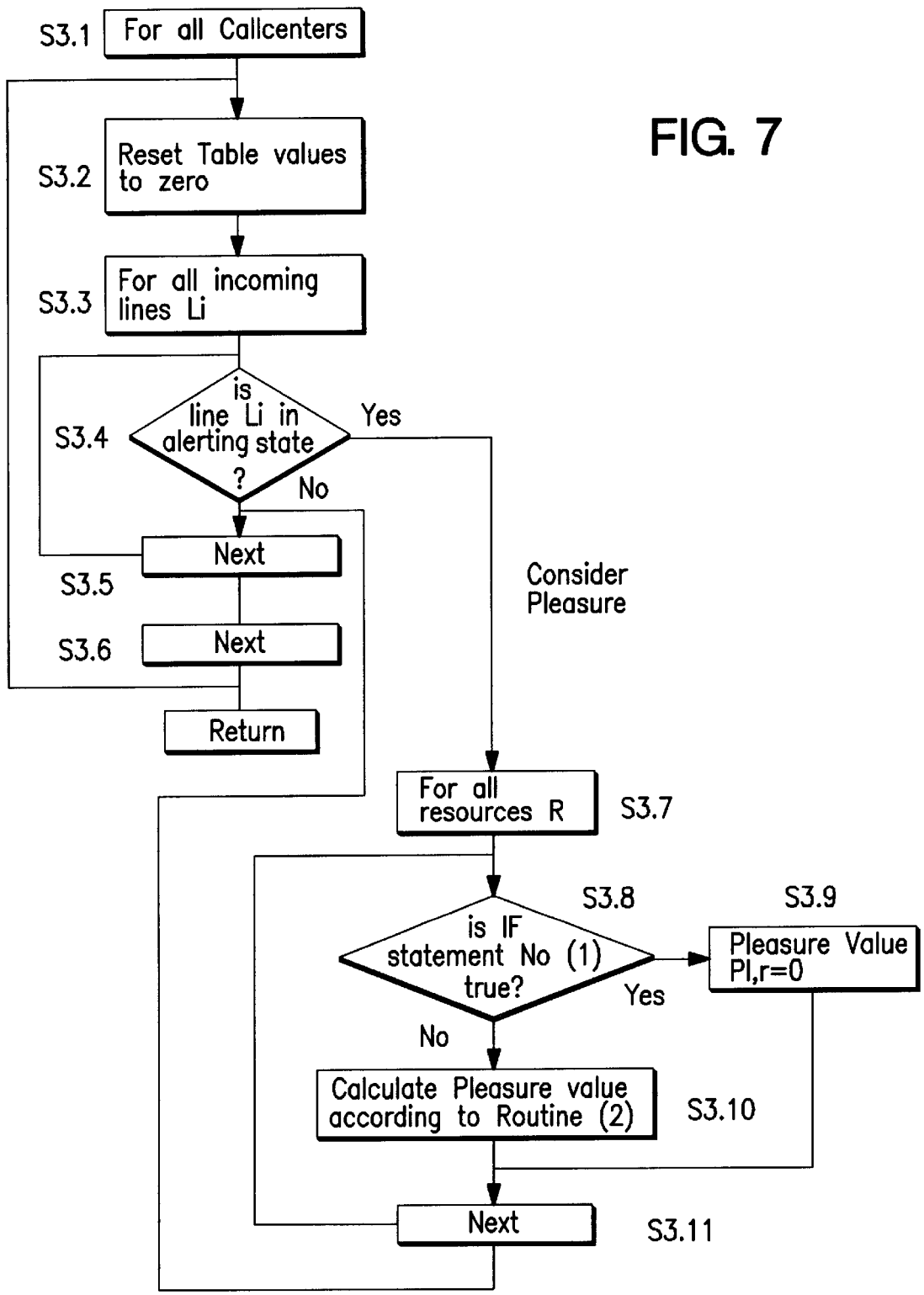
FIG. 7 is a flow chart of the computation of the pleasure values for the matrix.

The network provider may provide a plurality of Callcenters within the telephone network and a more detailed example of the algorithm used to compute the pleasure value matrix will now be described with reference to FIGS. 5, 6 and 7, for a configuration which provides a plurality of Callcenters.

Figure 5:
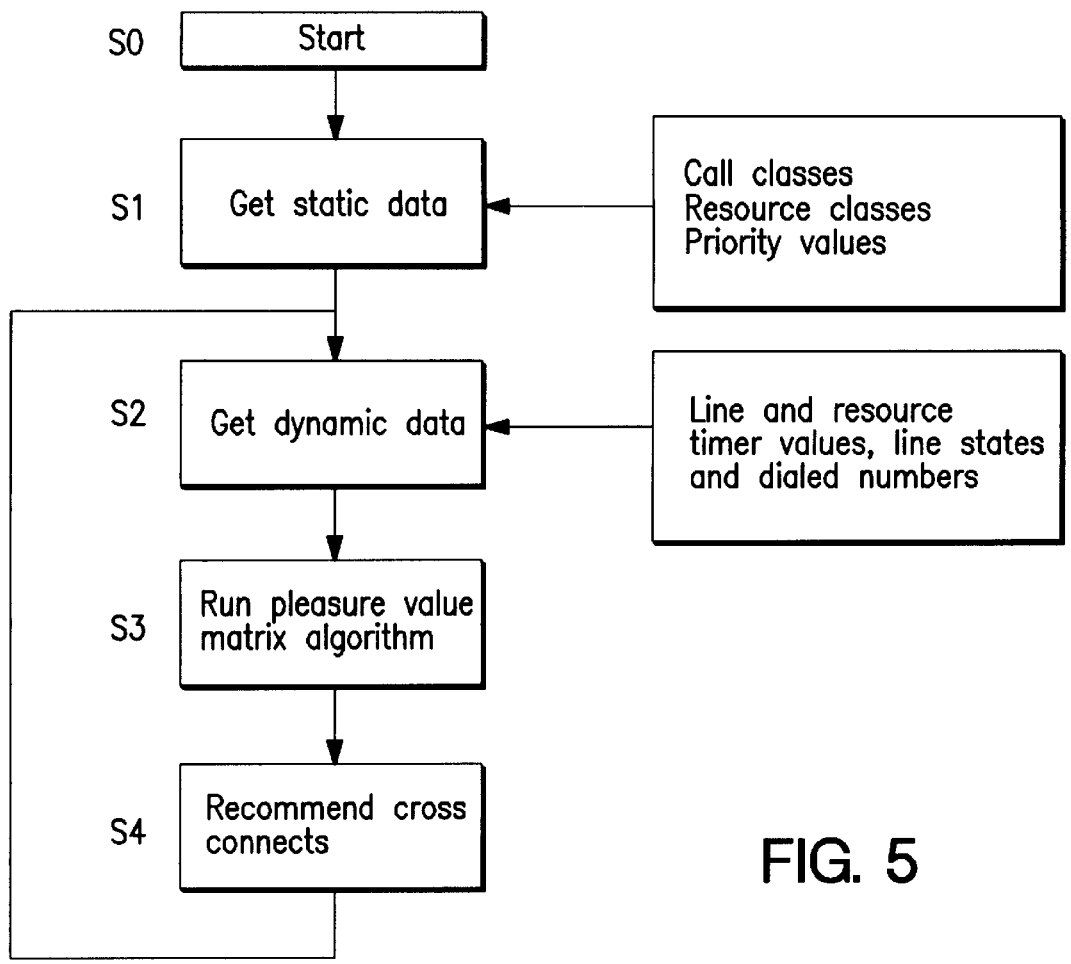
FIG. 5 is a flow chart of the operation of the apparatus shown in FIG. 4.

Referring to FIG. 5, this illustrates the overall operation. The procedure starts at step S0 and at step S1, the previously described static data is fetched from the Configuration Matrix. The static data includes the Call and resource classes and their associated Priority Values.

At step S2, the dynamic data previously described is fetched. The dynamic data includes the line timer values and the resource timer values derived from the line and resource timers 12, 14 shown in FIG. 4 together with information concerning the line states and the dialed numbers on the incoming lines $L_i$ derived from the line processor 16.

At step S3, the pleasure value Matrix algorithm is run so that, at step S4, a winner and runner up for the incoming line/resource combinations is recommended on the basis of the values of the pleasure value Matrix. The routine then returns to step S2 and the process is repeated successively.

The process for recommending cross-connects, shown at step S4, will now be described in more detail with reference to FIG. 6. The winners and runners up of the pleasure values for individual Callcenters are loaded into a Table shown in FIG. 6, in which the winner and runner up for each Callcenter is loaded in an individual row of the table. The routine shown in FIG. 6 is partitioned for individual Callcenters to ensure that the capacity of the system does not become spuriously used up by one Callcenter only. The sub-routine starts at step S4.1, and at step S4.2, the winner and the runner up of the various pleasure values of the pleasure value Matrix M are loaded into an appropriate line of the table, the winner and runner up having been selected from the computed values for the matrix by a process which will be described later with reference to FIG. 7. Before the values are loaded into the Table, the lines of the Table are reset to zero as will be explained later with reference to FIG. 7. At step S4.3, the routine is repeated for all of the Callcenters successively.

The running of the pleasure value Matrix algorithm (step S3 of FIG. 5) will now be described in more detail with reference to FIG. 7. In FIG. 7, the routine is run individually for all Callcenters in succession, as shown at step S3.1. At step S3.2, the values for the winner and runner up previously loaded into the table (FIG. 6) are set to zero in anticipation of new pleasure value data being computed. Then, as shown at step S3.3, all the incoming lines $L_i$ are considered individually and, at step S3.4, it is determined whether the line $L_i$ is in an Alerting state. If not, the next line is checked as shown at step S3.5. If the line is in the Alerting state, the routine proceeds to consider the pleasure values for the matrix M.

At step S3.7 the resources R are considered in sequence for the Callcenter, and at step S3.8, the IF statement (1) discussed previously, is checked to see whether it is true. If so, the pleasure value for the associated position 1,r (in the pleasure value matrix M) is set to zero at step S3.9. Otherwise, the routine moves to step S3.10 and the pleasure value $P_{1,r}$ is computed according to Routine (2) discussed previously in connection with the pleasure value algorithm. As shown at step S3.11 the routine is repeated for all of the resources R so that all pleasure values in the matrix M are computed.

Referring back to FIG. 6, the values for the matrix M are reviewed at step S4.2 and the winner and runner up are loaded into the Table.

Thus, for each Callcenter a winner and a runner up is successively directed to the cross-connection program that operates the cross-connect 10 shown in FIG. 4. The cross-connection program will try to connect as many of the winners and runners up as possible. However, if the winner is already connected, the cross-connect will make use of the runner up. Alternatively, if the call on the incoming winning line has for some reason moved to an idle state, the system will make use of the runner up. Once connected, the incoming line/resource combination will remain connected until the call is completed. Thus, the cross-connect will make new connections on the basis of the current winner as signified by the pleasure value matrix (or the runner up).

Hot Calls

Hot calls are defined where a particular call class is to be dealt with urgently by a particular resource. Hot calls can be given automatically a particular relatively large precedence value so that they are immediately provided with a high pleasure value. Hot calls also have another associated parameter referred to herein as reversion time. The reversion time may be user specified and indicates how long a call should be considered as a hot call and thus indicates how long a specified resource should be considered before the other resources associated with the call class are also considered. However, when the specified resource is "logged-off" the hot call reverts immediately to consider the other resources associated with the call class.

Hot calls can be defined statically or dynamically. As an example of a static hot call, it is a situation in which a call from a particular business customer is always to be connected to a particular account manager (resource). Static hot calls details can be entered into the configuration matrix. However, it may be desirable to store the hot calls information as an exception to the data stored in the configuration matrix, as a separate list. An example of a dynamic hot call is where a particular caller identified from the calling telephone number, is flagged for connection to a particular resource for subsequent enquiry later the same day, to ensure that the caller on a subsequent call is connected to the same resource. The list of dynamic hot calls is given a finite cyclic storage space, or a "time to live" property in order to prevent the size of the exception list growing indefinitely.

Figure 8:
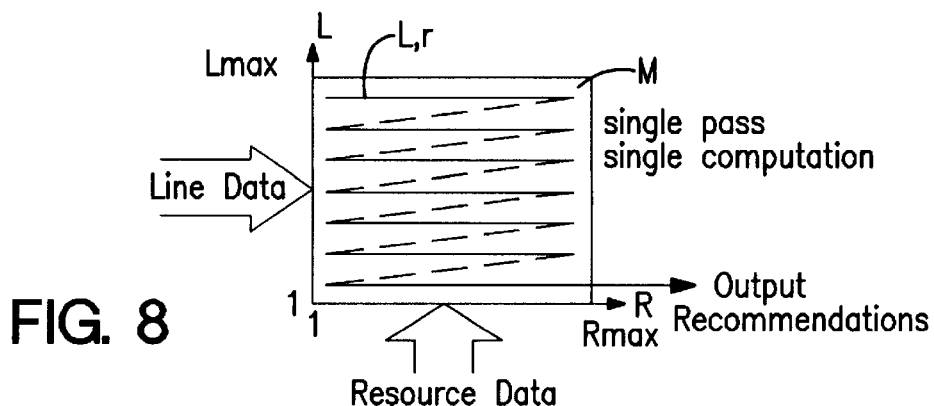
FIG. 8 illustrates a method of scanning values of the pleasure value matrix M.

The pleasure value matrix algorithm can be run in a number of different ways as will now be described. Referring to FIG. 8, this shows the pleasure value matrix M with the resources R shown as the ordinate and the incoming lines L shown as the abscissa. The algorithm repetitively performs a raster type scan through the points l,r of the matrix, computing the values $P_{l,r}$ for each matrix position successively. Thus, the step S3.10 is performed for each matrix position successively along the raster scan. In a test, this process was performed using a 120 MHz pentium based microprocessor. The matrix M consists of 240 lines $L_i$ and 240 resources R, with 128 line classes and 128 resource classes. The matrix was arranged as eight call centers, each of 30 line cross 30 resources. The results obtained showed that two cross-connection recommendations per Callcenter could be provided every 128 ms.

Figure 9:
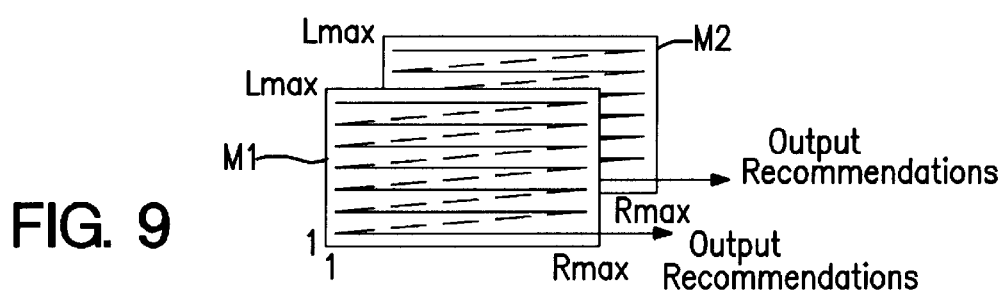
FIG. 9 illustrates a scanning method in which two matrices of the pleasure values are computed in parallel.

An alternative processing technique shown in FIG. 9 makes use of two processors operating in parallel that compute two parallel pleasure matrices M1, M2. The speed of operation is the same as the configuration shown in FIG. 8 but with the advantage that the resulting system is fault tolerant because either of the recommendations produced by the parallel processors can be used.

Figure 10:
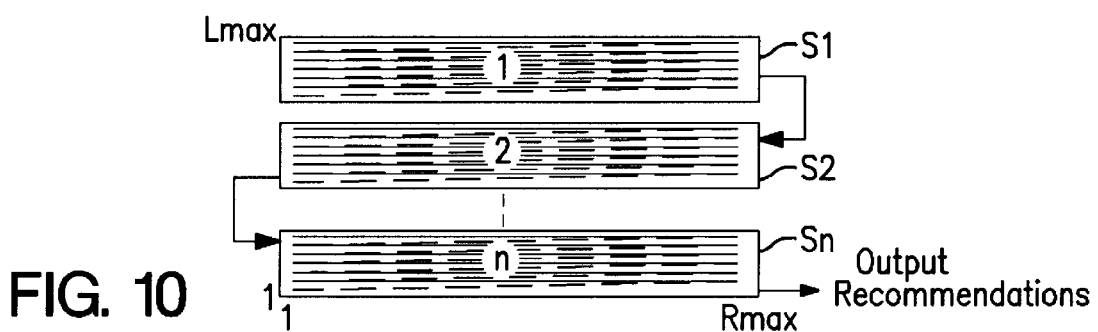
FIG. 10 illustrates a scanning method in which the pleasure value matrix is arranged in strips.

A further alternative processing method is shown in FIG. 10, in which the $L_i \times R$ matrix M is arranged in n strips S1, S2, Sn of Lmax/n lines each. Each strip has access to all of the resources $R_1–R_n$. The pleasure values for each strip are computed in parallel by n parallel processors. Thus, referring to FIG. 10, the winner and runner up for strip S1 is calculated with the processor for S1. The winner and runner up for strip S2 are calculated by the processor for S2, and similar parallel computations are carried out for the other strips, and the overall winner and runner up is selected for the matrix M.

Figure 11:
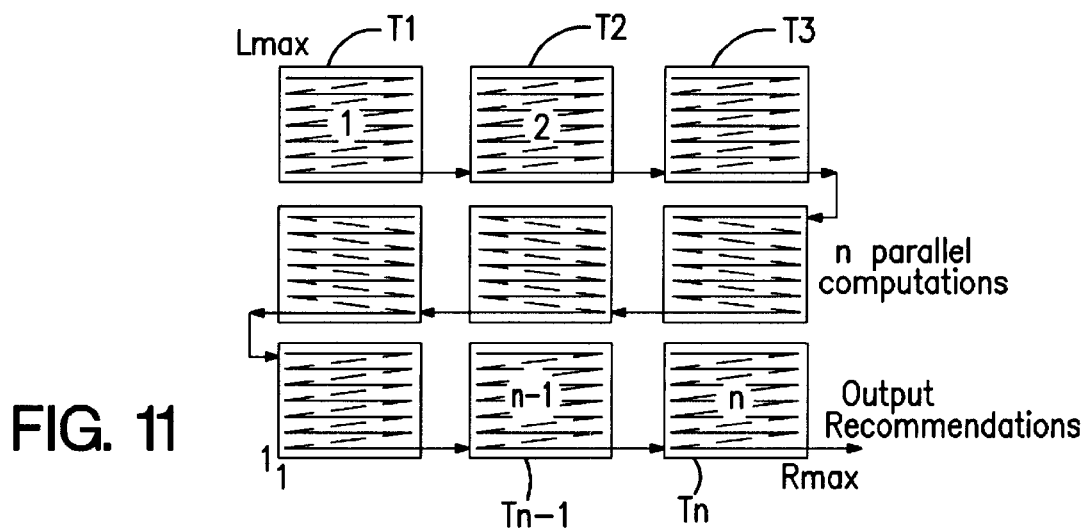
FIG. 11 illustrates a scanning method in which the matrix is arranged in tiles.

Referring to FIG. 11, the pleasure matrix M is broken up into tiles $T_n$, which each has access to the configuration data for the entire system. The pleasure value matrix computations are carried out in parallel for each tile so that individual processors are provided for the tiles respectively. The individual winners and runners up for each of the tiles are compared with one another so as to provide an overall output recommendation. In FIG. 11, the tiles are shown to be contiguous but as an alternative the tiles may overlap and may be of different sizes. Larger tiles can be used for regions of the matrix where little traffic is expected.

Figure 12:
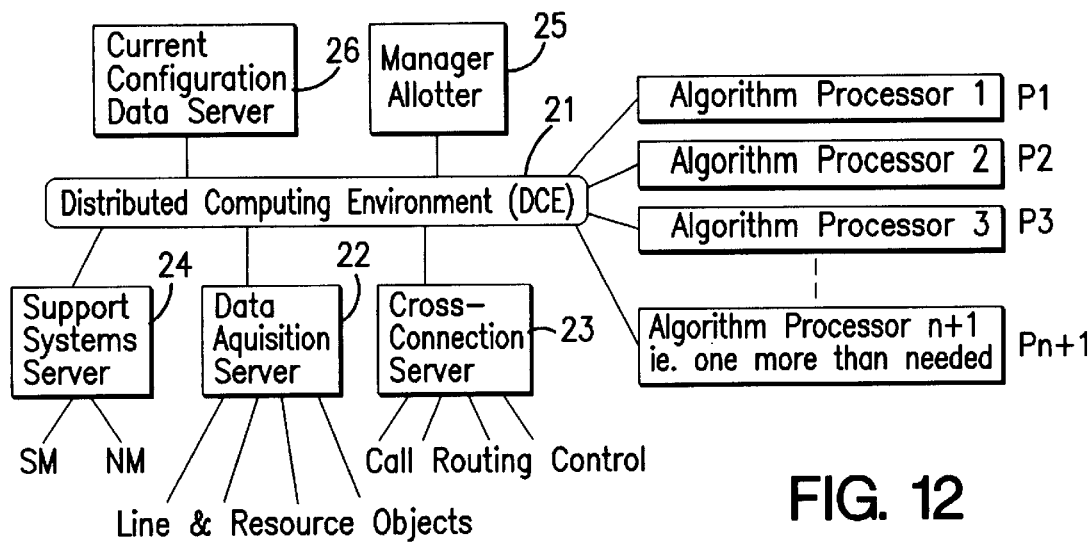
FIG. 12 illustrates an example of the apparatus according to the invention which makes use of a distributed computing environment.

Referring to FIG. 12, the configuration makes use of a distributed computing environment (DCE) in which a number of parallel algorithm processors are provided that are allocated to particular Callcenters, tiles or strips. The allocation of the processors can be varied dynamically to take account of changes in utilization of the various Callcenters. Thus, as shown in FIG. 12, a plurality of pleasure value matrix algorithm processors P1–Pn+1 are coupled to a DCE 21 to provide a dynamic pool of computation engines. A data acquisition server 22 provides the DCE 21 with current information concerning the lines and resources $L_i$, R. The cross-connect (reference 10 in FIG. 4) is controlled by a server 23 in response to data from the algorithm processors P. A support system server 24 is provided for remote access by service management and network management controllers, e.g. for dealing with faults, and setting up new customers. The choice of Callcenters, tiles or strips processed by the individual algorithm processors P, is controlled by a manager/allotter 25 and data concerning the current status of this system is held in server 26. The system shown in FIG. 12 can be distributed over a large geographical area e.g. over an entire country or state. Furthermore, the architecture allows additional processors to be added readily to provide additional Callcenters when required. Periodically, the manager/allotter 25 reviews the processing capacity assigned to each Callcenter and may reallocate algorithm processors to ensure that the computing power is allocated where necessary to achieve satisfactory response times. The algorithm processors may be distributed around the country and allocated as required.

Figure 13B:
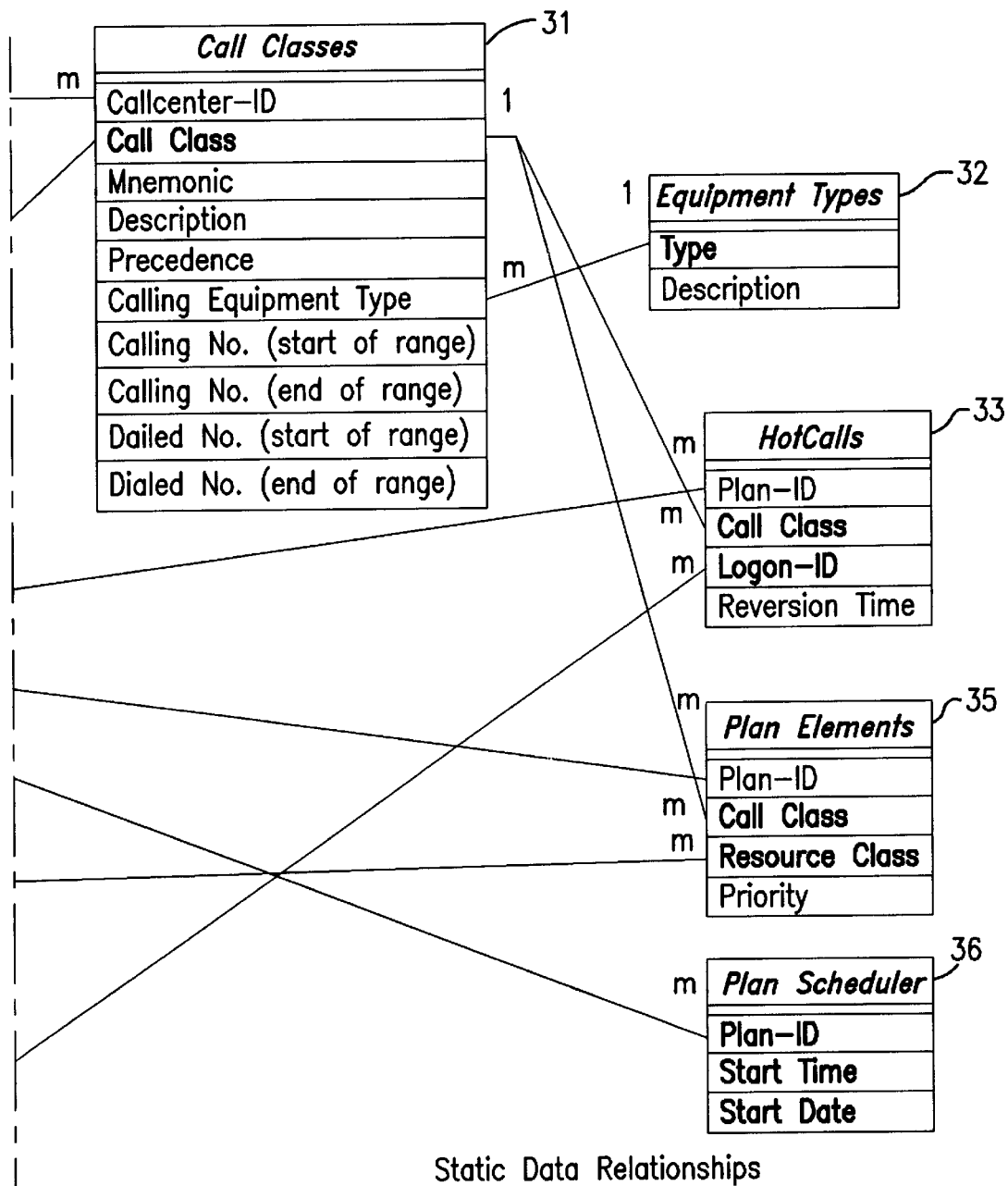
FIG. 13 illustrates an organization of static data used in computing pleasure values.

Referring now to FIG. 13, this shows the configuration of the static data which is processed by the pleasure value matrix algorithm. It will be seen that the static data is arranged on the basis of Callcenters 28, outgoing lines (trunks) $L_o$, incoming lines $L_i$, resource classes 29, log-on ID's 30, call classes 31, equipment types 32, hot calls 33, plans 34, plan elements 35 and plan schedulers 36.

It will be seen that this configuration allows Callcenters to be set up for use with particular sets of resources, call classes and hot calls. Furthermore, the plans 34, plan elements and plan scheduler allow particular hot calls to be implemented at different times of the day and particular priority values to be implemented at different times.

In the embodiments described so far, the dynamic data may be configured as shown in FIG. 14, with the dynamic line data, resource data and hot call data being configured as shown in Tables 1.1, 1.2 and 1.3 respectively. Each pleasure value matrix algorithm processor thus extracts data from the various static and dynamic tables in order to compute the pleasure values.

Figure 15:
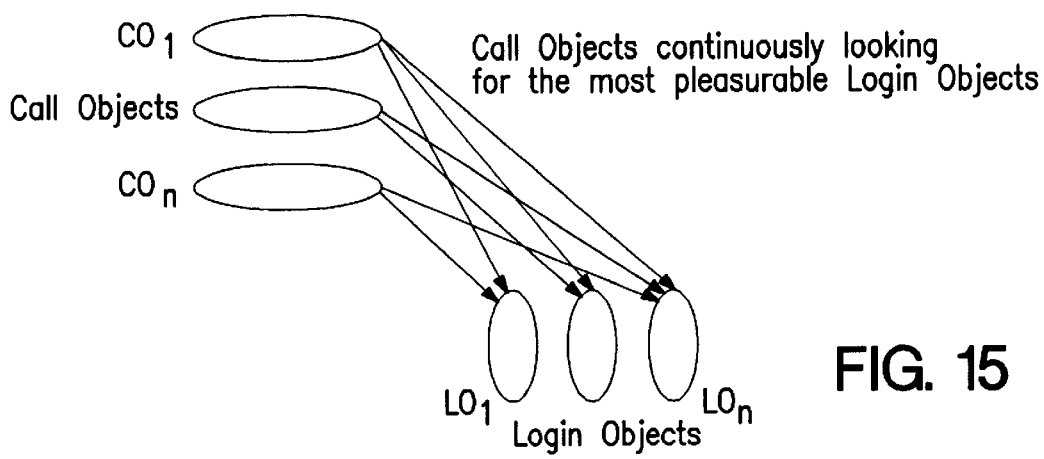
FIG. 15 illustrates an alternative object oriented computing method.

An alternative configuration of the tables will now be described, which speeds up the processing performed by the pleasure value algorithm processors. In this modification, the static and dynamic data are arranged in terms of call objects associated with the individual incoming lines and log-in objects associated with the resources. The pleasure value matrix algorithm is configured so that the call objects continuously look for the most pleasurable log-in objects. Referring to FIG. 15, there are a number of log-in objects CO1–COn associated with incoming lines that are in the alerting state. Similarly, log-in objects LO1–LOm are created whenever a resource R enters an idle state. The call objects are destroyed when the relevant line become idle or when accepted for cross-connection by the cross-connection program. The log-in objects are destroyed whenever a resource is logged off or accepted for cross-connection by the cross-connection program. Examples of tables that comprise the call object data and log-in object data are shown in table 1.4 and 1.5 in FIG. 16. During initialization, all the relevant static configuration data together with the relevant dynamic data is entered into the table for the object. This has the advantage that the configuration data is looked up only once however many computations passes are made subsequently. Furthermore, because the pleasure value matrix includes many values of null data due to the fact that many of the incoming lines are not in the Alerting state and the probability that the resources are in an idle state is relatively low, the number of call in and log-in objects is significantly reduced compared to the number of incoming lines and resources.

Figure 17:
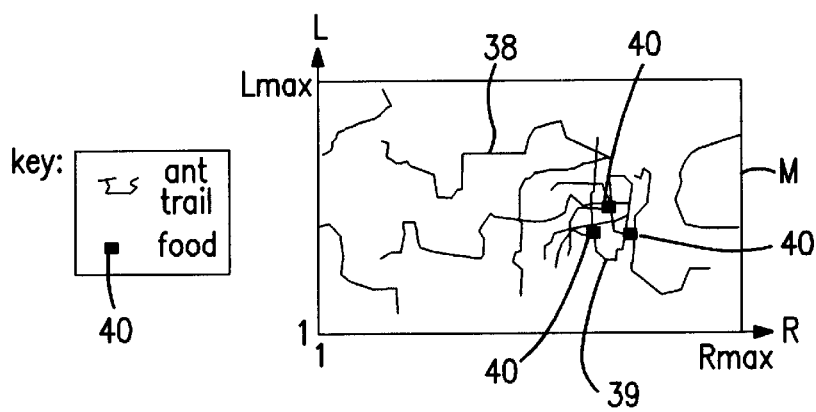
FIG. 17 illustrates a method of locating high values in the pleasure value matrix with software ants.

Another way of identifying the positions of highest pleasure in the pleasure value matrix M will now be described with reference to FIG. 17. In this arrangement, the pleasure value algorithm is configured to mimic the action of a swarm of ants moving around in the L–R space of the matrix M. A number of ant objects each having X and Y coordinate attributes are configured to wander around the matrix M at random looking for food which is defined as the matrix positions of non-zero pleasure value. Once one of the ants has been given food, it will call a friend i.e. one of the other ants in the swarm over to that vicinity. In this way, the computing power is focused at positions where the cross-connections look most promising. Thus referring to FIG. 18, the software ants move along trails 38, 39 until they reach location 40 at which they find "food" namely a non-zero pleasure value in the matrix.

In a modification, the ants can be replaced by software semi-autonomous artificial lifeforms. Each lifeform is represented by a small segment of interpreted code competing for execution time and memory whilst wondering around the matrix M in L×R space. If a non-zero pleasure value is found, then more execution time and memory is allocated to the lucky lifeform, at the expense of others. Furthermore, successful lifeforms are allowed to reproduce i.e. copy themselves and occasionally mutate, by introducing an error, a delete or a new line of the interpreted software code. Some of the children may perform better than the parent. Others do not find any reward in a reasonable time and perish i.e. survival of the fittest. This approach draws on ideas presented by J. F. Martin in British Telecommunications Engineering Vol. 13 part 4, January 1995, p. 319.

Another alternative is to use a neural network as shown in FIG. 18. The network has an input layer 41 which in this example includes 1002000 neurons 42 that each receive data from the line timers 12, the resource timers 14 and other inputs which receive priority data dependent on the call classes and resource class. Each input can receive multi-bit values e.g. 16 bit values. The neurons 42 are interconnected to hidden layer neurons 43, which are connected to neurons 44 in an output layer. The output layer includes a configuration 45 for selecting the highest pleasure value for propagation as the winning recommendation for the cross-connection program. An example of building blocks which can be used to form the neural network is the "Hannibal" chip described by Myers, Vincent and Orrey, Neural Computing 5, 1993 pp 25–37. Reference is also directed to "A High Performance Digital Processor for Implementing Large Artificial Neural Networks" Myers, Vincent, Cox, Harbridge, Orrey, Williamson and Naylor, BT Technology Journal Vol.10 No. 3, July 1992 page 134. Hannibal allows 16 bit weights on each neuron input.

Another way of computing the pleasure values in the matrix M is to use a hybrid solution based on a combination of the previously described techniques.

Referring to FIG. 19, this shows the pleasure value matrix in which the object orientation described with reference to FIG. 15 is adopted, for Callcenters Cc of different sizes. A typical Callcenter Cc1 shown shaded, will require 40 lines and resources whereas some are larger e.g. Cc2 and would require Callcenters of size 300 lines×300 resources. The Callcenters may be arranged as shown in the L×R matrix shown in FIG. 19.

In an alternative shown in FIG. 20, parallel processors are used in order to set up parallel matrices M in order to provide extra resilience. Each matrix includes the Callcenter configuration shown in FIG. 20.

In FIG. 21, the matrix is arranged in strips S in the manner described previously with reference to FIG. 11. However, the individual Callcenters shown are each of different sizes, with different numbers of lines and resources.

Figure 22:
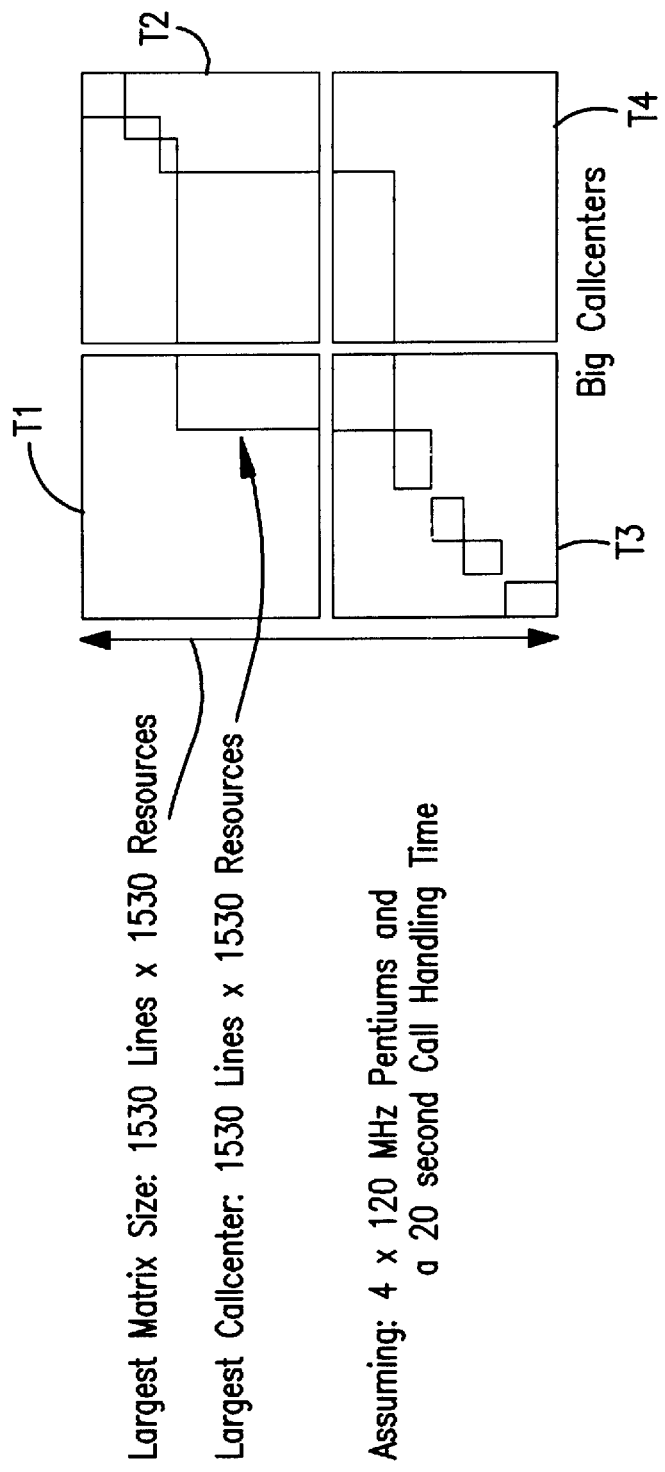

In FIG. 22, a tile configuration is shown which is processed in the manner described previously with reference to FIG. 12. This arrangement is particularly suited to very large Callcenters and in the example shown, a Callcenter matrix of 1530 lines×1530 resources is shown, which spans the individual tiles. Additionally, a number of smaller Callcenters are shown.

Figure 23:
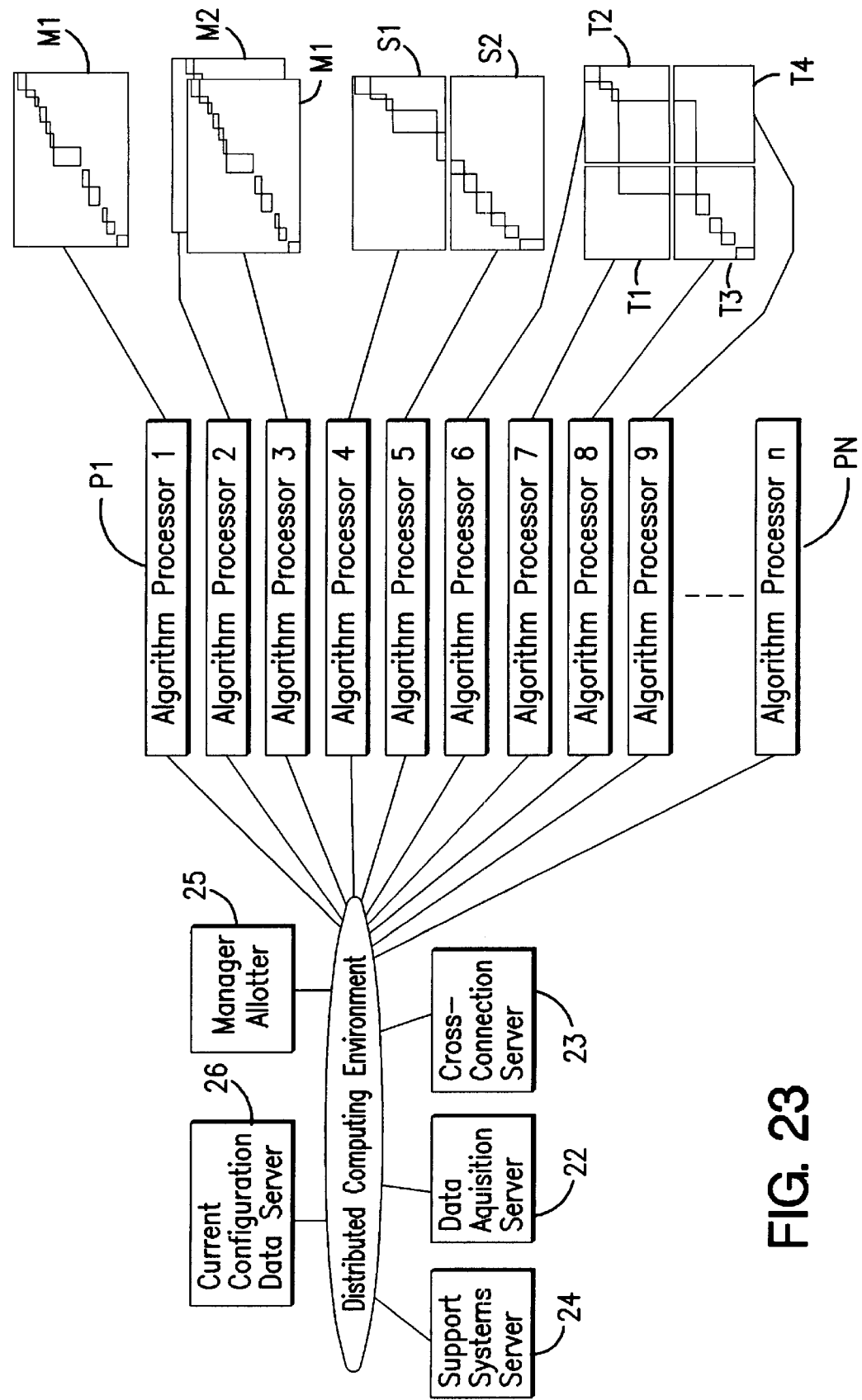
FIG. 23 is a block diagram of a distributed system that uses the different hybrid solutions described with reference to FIGS. 19 to 22.

Referring now to FIG. 23, this shows how the various computational techniques can be combined into a single DCE similar to that previously described with reference to FIG. 12.

Figure 24:
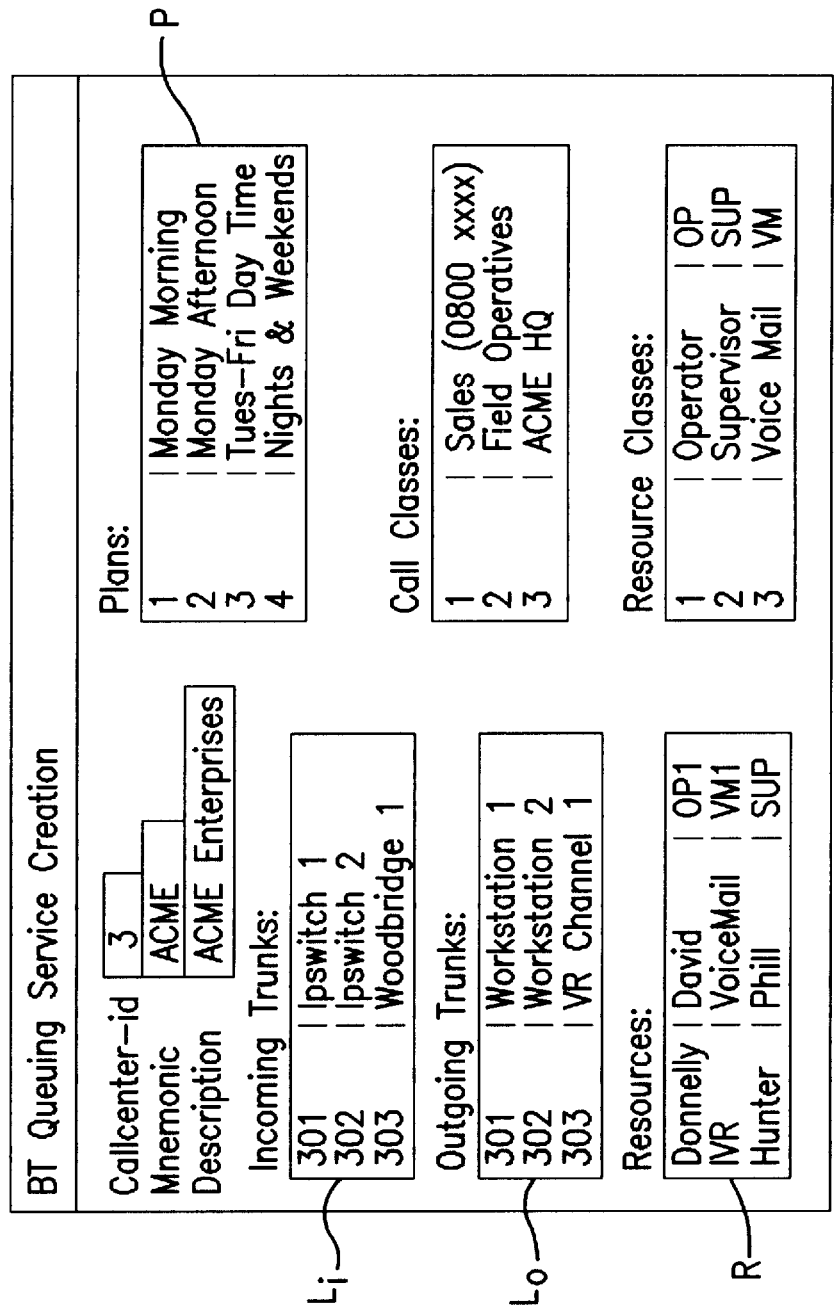
FIG. 24 is a schematic illustration of a display provided by the apparatus of FIG. 4, of its Callcenter configuration.

Referring again to FIG. 4, a display 45 is shown connected to the processor 11, which is used to provide a display of the configuration for each Callcenter. The display 45 typically comprises a video monitor in association with a personal computer but other suitable displays will be readily apparent to those skilled in the art. An example of the display provided is shown in FIG. 24. The display illustrates that three incoming trunk lines, that correspond to incoming lines $L_i$ are connected to the Callcenter, together with three outgoing lines $L_o$. Three resources R are connected to the outgoing lines, that comprise telephone operators David Donnelly and Phill Hunter and a voice mail facility VM1. The Callcenter is configured to perform three plans P. Three call classes are shown, together with three resource classes. It will be seen that resource David Donnelly (OP1) falls within the resource class of an operator whereas Phill Hunter falls within the resource class of a supervisor. These two resource classes will be capable of handling different call classes.

Figure 25:
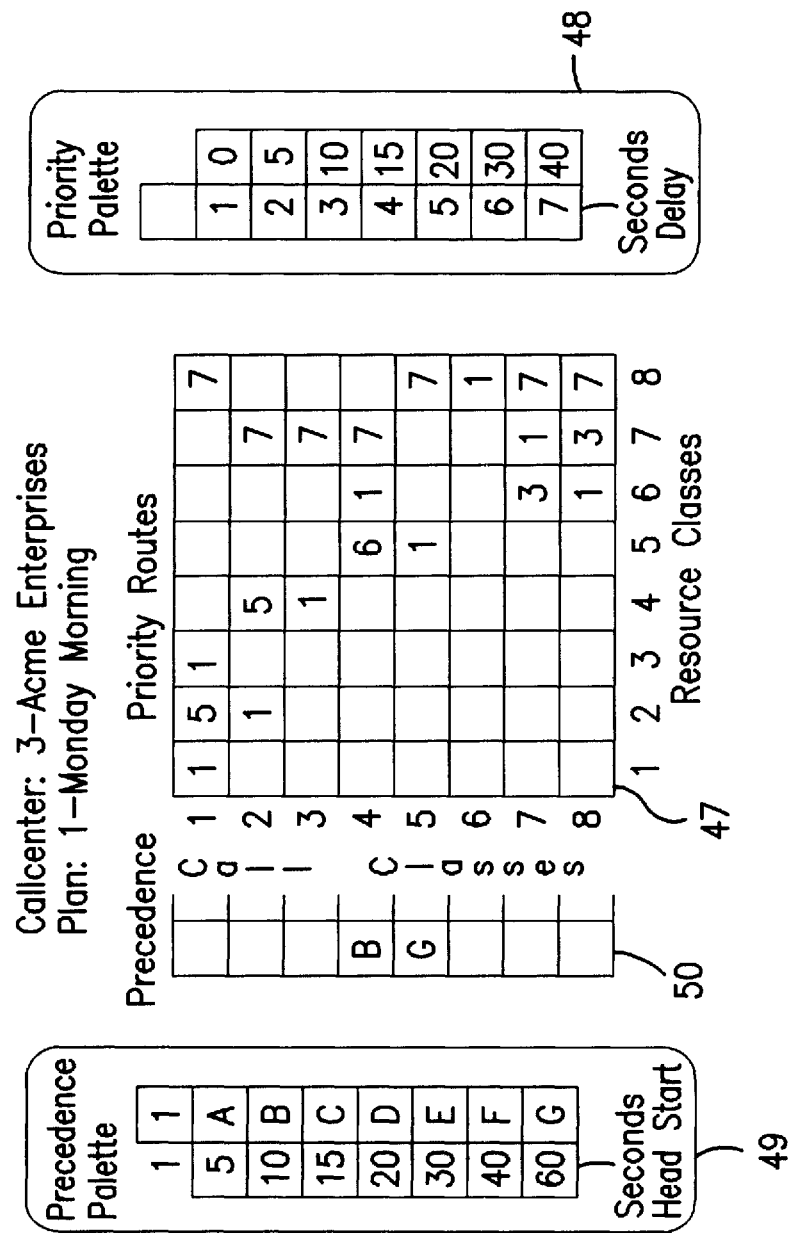
FIG. 25 is a display provided by the apparatus of FIG. 4, of the routing priorities for the Callcenter.

The call class/resource class combinations that give rise to different priorities can be programmed using a mapping tool as shown in FIG. 25. The mapping tool display "pops up" when a particular Plan number on the display 45 (FIG. 24) is selected. The display shown in FIG. 26 can be manipulated by a manual control 46 (FIG. 4) which typically comprises a mouse or a conventional keyboard.

The display shown in FIG. 25 consists of a central two dimensional grid 47 of call class versus resource class. The priority value associated with particular call class/resource class combinations is illustrated on the grid in terms of a color, which indicates the urgency of the priority value. On the right hand side of the display, a palette 48 indicates the number of seconds delay associated with the displayed priority values.

On the left hand side of the display, a palette indicating the precedence associated with the call classes is given. The precedence of the call classes is shown on display 50, corresponding to the row of call classes shown for the display 47. The "head start" in seconds, associated with a particular precedence value, which are coded in terms of colors, is shown in the display 49. The display indicates the plan 1—Monday morning that is shown in the plan display P of FIG. 24. Corresponding displays for the other plans e.g. Monday afternoon will be available as separate displays. Thus, an operator can set up appropriate plans with different priorities and precedences to optimize available resources. Furthermore, the Callcenter manager will be able to customize the plans to take account of changes on a day to day basis for example Bank Holidays, or when operators are sick or equipment problems arise. Furthermore, the plans can be modified on-line on the basis of expert information available to the Callcenter manager.

Many modifications to the described apparatus fall within the scope of the claimed invention. For example, whilst the apparatus has been described as being part of a public telephone network, it could be located in a private exchange at a customers premises, with the resources at least in part being located at the premises of the customer. The inherent flexibility of the apparatus in accordance with the invention permits many different physical configurations to be used.

I claim:

1. A method of distributing concurrent incoming calls on a plurality of lines to a plurality of resources, comprising:

associating with each of a plurality of different individual combinations of the lines and resources, a respective value of an operating parameter in dependence upon a desirability according to predetermined criteria, of interconnecting the line and resource of the combination, repeatedly reviewing the values of the operating parameter corresponding to the combinations, and selecting at least one of the combinations for interconnection as a result of the reviews.

2. A method according to claim 1 wherein the value of the operating parameter associated with a particular line and resource combination is a function of the time that an incoming call has been waiting on the line to be connected to one of the resources.

3. A method according to claim 1 wherein the value of the parameter associated with a particular line and resource combination is a function of the time that the resource has been idle.

4. A method according to claim 1 wherein the incoming calls on said plurality of lines are of plurality of different classes, the method including detecting the class of the incoming call for the respective combinations, and setting the value of the parameter associated with a particular line and resource combination as a function of a precedence associated with the class of the incoming call on the line for the combination.

5. A method according to claim 1 wherein the resources are configured in resource classes, the method including monitoring the resource classes, and setting the value of the operating parameter associated with a particular line and resource combination as a function of the class of the resource for said combination.

6. A method according to claim 1 wherein the incoming calls on said plurality of lines are of plurality of different classes, the method including detecting the class of the incoming call for the respective combinations, and setting the value of the parameter associated with a particular line and resource combination as a function of a precedence associated with the class of the incoming call on the line for the combination wherein the resources are configured in resource classes, the method including monitoring the resource classes, and setting the value of the operating parameter associated with a particular line and resource combination as a function of the class of the resource for said combination, and wherein the parameter is a function of a priority value that has predetermined value dependent upon the particular values of the call class and resource class for the line and resource combination.

7. A method according to claim 4 wherein a particular call class is designated a hot call with a precedence for causing immediate selection of the line with the incoming hot call for connection to a particular one of said resources.

8. A method according to claim 7 wherein the precedence of the hot call reverts to a different value after a predetermined reversion time.

9. A method according to claim 1 wherein the operating parameter is a function of user defined expert data.

10. A method according to claim 8 wherein the priority values for particular line and resource combinations are manually altered according to user determined expert data.

11. A method according to claim 1 including selecting a first most desirable and a second next most desirable line and resource combination on the basis of the values of the operating parameter associated therewith during each of said periodic reviews.

12. Apparatus for distributing a plurality of concurrent incoming calls to a plurality of resources, comprising:

a plurality of incoming lines for the calls, a plurality of outgoing lines for connection to the resources, means for associating with each of a plurality of different individual combinations of the incoming and outgoing lines, a respective value of an operating parameter as a function of a desirability according to predetermined criteria, of interconnecting a call on the incoming line and resource for the outgoing line corresponding to the combination, and means for repeatedly reviewing the values of the parameters corresponding to the combinations, and selecting at least one of the combinations in dependence upon the review.

13. Apparatus according to claim 12 including incoming call timing means for determining the durations for which incoming calls have been waiting on respective ones of the incoming lines to be connected to the resources, and processing means for determining the value of the operating parameter associated with particular line and resource combinations as a function of the waiting time of the call on the respective incoming line.

14. Apparatus according to claim 12 including resource timer means for determining the durations for which resources have been idle, and processing means for determining the value of the operating parameter associated with particular incoming and outgoing line combinations as a function of the time that the resource associated therewith has been idle.

15. Apparatus according to claim 12, including means responsive to the incoming calls to determine whether they are of particular classes and to attribute a precedence to each of the incoming calls according to its class, and processing means for determining the value of the operating parameter associated with a particular incoming and outgoing line combination as a function of the precedence of the call on the incoming line for the combination.

16. Apparatus according to claim 15 including user operable means for controlling the precedence attributed to the respective call classes.

17. Apparatus according to claim 15 including means for designating a particular one of the call classes as a hot call with a precedence for causing immediate selection of the incoming line with the hot call for connection to one of said resources.

18. Apparatus according to claim 17 including reversion means for changing the precedence of the hot call to a different value after a predetermined reversion time.

19. Apparatus according to any claim 12 including resource classification means for classifying the resources associated with the outgoing lines into resource classes, and processing means for determining the value of the operating parameter associated with a particular line and resource combination as a function of the class of the resource for said combination.

20. Apparatus according to claim 12 including means responsive to the incoming calls to determine whether they are of particular classes and to attribute a precedence to each of the incoming calls according to its class, and processing means for determining the value of the operating parameter associated with a particular incoming and outgoing line combination as a function of the precedence of the call on the incoming line for the combination resource classification means for classifying the resources associated with the outgoing lines into resource classes, and processing means for determining the value of the operating parameter associated with a particular line and resource combination as a function of the class of the resource for said combination; and means for attributing to each combination a priority value that has a value dependent upon the particular values of the call class and resource class for said combination.

21. Apparatus according to claim 20 including means defining a table of the call classes and the resource classes, and the priority values associated with different combinations of the call and resource classes.

22. Apparatus according to claim 20 including user operable input means for modifying the priority values for particular call class and resource lass combinations according to user determined expert data.

23. Apparatus according to claim 20, including display means for displaying a two-dimensional matrix of call classes and resource classes, and for providing a visual indication on the matrix of the priority value currently associated with each resource class/call class combination.

24. Apparatus according to claim 23 wherein the display means provides a display of the current values of precedence associated with different call classes.

25. Apparatus according to claim 12 including cross connect means operative to interconnect the selected combination of input and output lines.

26. Apparatus according to claim 12 including means for selecting a first most desirable and a second next most desirable incoming and outgoing line combination on the basis of the values of the operating parameter associated therewith during each of said periodic reviews.

27. Apparatus according to claim 26 including means responsive to the selecting means for attempting to connect the first combination but otherwise the second combination.

28. Apparatus according to claim 12 configured for operation in a public network telephone exchange, with the incoming and outgoing lines being arranged to connect incoming calls from remote locations to the resources disposed at least in part at locations remote from the exchange.

29. Apparatus according to claim 12 configured for operation in a private branch telephone exchange, with the incoming and outgoing lines being arranged to connect incoming calls from remote locations to the resources disposed at least in part at locations proximate to the exchange.

30. Apparatus according to claim 12 claim wherein the selecting means includes scanning means operative to scan through the current operating parameter values for all of said combinations, and parameter value selection means operative to select the combination which has an associated scanned value of said parameter that corresponds to the highest of the scanned values in respect of said desirability of connection.

31. Apparatus according to claim 30 including first and second of said scanning means and said parameter selection means, and means for choosing the combination to be connected as a function of the selection made by either or both of the parameter value selection means.

32. Apparatus according to claim 31 wherein the first and second scanning means run asynchronously.

33. Apparatus according to claim 12 wherein the selecting means includes tile scanning means operative to scan through groups of the current operating parameter values successively, to select from each said group the combination which has an associated scanned value of said parameter that corresponds to the highest of the scanned values in respect of said desirability of connection, and to compare the highest parameter values selected for each respective said group so as to select the highest value from all the scanned groups.

34. Apparatus according to claim 12 wherein the selecting means includes parallel scanning means operative to scan through groups of the current operating parameter values concurrently, to select for each said group the combination which has an associated scanned value of said parameter that corresponds to the highest of the scanned values in respect of said desirability of connection, and to compare the highest parameter values selected for each respective said group so as to select the highest value from all the scanned groups.

35. A distributed computing environment system including a plurality of apparatuses each according to claim 12, and control management means for allocating selected groups of said incoming and outgoing lines to each respective said apparatus.

36. Apparatus according to claim 12 including means for defining log-in objects corresponding to the resources respectively as function of static data in respect of the resource and also dynamic data dependent upon whether the resource is idle or in an active state, and means for defining call objects comprising static data for particular call types and\or classes and dynamic data concerning the occurrence of calls on the incoming lines.

37. Apparatus according to any one of claims 12 to 30 including means for defining a plurality of ants operative to wander initially essentially at random through a matrix of the values of the operating parameter associated with said combinations to find the value thereof corresponding to the most desirable combination of incoming line and resource to be connected, the ants being operative to communicate with one another so that they move collectively toward a region of the matrix in which at least one value of the operating parameter indicates an increased desirability of interconnection of the resource/incoming call combination associated therewith as compared with the majority of the parameter values in the matrix.

38. Apparatus according to claim 12 including a plurality of artificial lifeform software elements for computing the values of the operating parameter for positions in a matrix of the values associated with said incoming call/resource combinations, and means for allocating computing power to the lifeforms selectively depending on the success of the lifeform in computing a value of the operating parameter that indicates desirability of the interconnection of the resource/incoming call combination.

39. Apparatus according to claim 12 including a neural network for selecting the most desirable combination.

40. A method of distributing concurrent incoming calls of different call classes on any one of a plurality of incoming lines, to a plurality of resources, comprising:

detecting the classes of the incoming calls;

associating with each of a plurality of different individual combinations of the lines and resources, a respective value of an operating parameter in dependence upon a desirability according to predetermined criteria, of interconnecting the line and resource of the combination, said criteria including the time that the call on the incoming line has been waiting to be connected to one of the resources and its class;

repeatedly reviewing the values of the operating parameter corresponding to the combinations; and selecting at least one of the combinations for interconnection as a result of the reviews.

41. A method according to claim 40 wherein the resources are of a plurality of different classes and the criteria include the time that the respective resources have been idle and their class.

* * * * *